United States Patent
Capota et al.

(10) Patent No.: US 12,307,223 B2
(45) Date of Patent: May 20, 2025

(54) EXECUTION PLACEMENT OF A COMPUTER PROGRAM USING A TRAINED MACHINE-LEARNING MODEL

(71) Applicant: Intel Corporation, Santa Clara, CA (US)

(72) Inventors: Mihai Capota, Portland, OR (US); Guixiang Ma, Hillsboro, OR (US); Shengtian Zhou, Palo Alto, CA (US); Niranjan Hasabnis, Fremont, CA (US); Nesreen Ahmed, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 645 days.

(21) Appl. No.: 17/644,126

(22) Filed: Dec. 14, 2021

(65) Prior Publication Data

US 2022/0107793 A1    Apr. 7, 2022

(51) Int. Cl.
| | |
|---|---|
| *G06F 8/41* | (2018.01) |
| *G06F 11/34* | (2006.01) |
| *G06F 18/21* | (2023.01) |
| *G06N 20/00* | (2019.01) |

(52) U.S. Cl.
CPC ............. *G06F 8/443* (2013.01); *G06F 8/433* (2013.01); *G06F 11/3428* (2013.01); *G06F 18/217* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 8,751,856 B2 | 6/2014 | Lumpp et al. | |
| 11,875,191 B1* | 1/2024 | Plenderleith | ........ H04W 64/003 |
| 2020/0249998 A1 | 8/2020 | Che et al. | |
| 2020/0293838 A1 | 9/2020 | Li et al. | |

(Continued)

OTHER PUBLICATIONS

Intel Oneapi Programming Guide, 2020 https://software.intel.com/content/www/us/en/develop/documentation/oneapi-programming-guide/top/oneapi-programming-model/device-selection.html.

(Continued)

*Primary Examiner* — Qing Chen
(74) *Attorney, Agent, or Firm* — 2SPL Patent Attorneys PartG mbB; Kieran O'Leary

(57) ABSTRACT

Various examples relate to an apparatus, device, method, and computer program for determining a placement of an execution of a computer program, and to an apparatus, device, method, and computer program for training at least one machine-learning model. The apparatus for determining the placement of an execution of a computer program comprises processing circuitry that is configured to generate a graph representation of a computer program, generate, using a first machine-learning model, a vector embedding of the graph representation of the computer program, and to determine, based on an output of a second machine-learning model, a placement of an execution of the computer program on one or more hardware devices of a heterogenous plurality of hardware devices of a computer system, with the vector embedding and information on the load of the hardware devices being provided as input to the second machine-learning model.

22 Claims, 7 Drawing Sheets

(56) References Cited

U.S. PATENT DOCUMENTS

| | | |
|---|---|---|
| 2021/0049465 A1 | 2/2021 | Bogdan et al. |
| 2021/0136596 A1 | 5/2021 | O'Shea |
| 2022/0108147 A1* | 4/2022 | Wan .................... G06F 18/2178 |
| 2022/0132270 A1* | 4/2022 | Murata ................... H04W 4/33 |
| 2022/0158910 A1* | 5/2022 | Santos ............... H04L 41/0806 |

OTHER PUBLICATIONS

Justin Gottschlich, Armando Solar-Lezama, Nesime Tatbul, Michael Carbin, Martin Rinard, Regina Barzilay, Saman Amarasinghe, Joshua B Tenenbaum, Tim Matson 2018. The Three Pillars of Machine Programming. arXiv preprint. https://arxiv.org/abs/1803.07244.

Yao Xiao, Guixiang Ma, Nesreen K. Ahmed, Theodore L. Willke, Shahin Nazarian and Paul Bogdan 2021. Deep Graph Learning for Program Analysis and System Optimization. Workshop on Graph Neural Networks and Systems (GNNSys). https://gnnsys.github.io/papers/GNNSys21_paper_15.pdf.

Cummins, Chris and Fisches, Zacharias and Ben-Nun, Tal and Hoefler, Torsten and O'Boyle, Michael and Leather, Hugh. 2021. ProGraML: A Graph-based Program Representation for Data Flow Analysis and Compiler Optimizations. International Conference on Machine Learning (ICML). https://chriscummins.cc/pub/2021-icml.pdf.

Cristiana Bolchini, Stefano Cherubin, Gianluca C. Durelli, Simone Libutti, Antonio Miele and Marco D. Santambrogio. 2018. A runtime controller for openCL applications on heterogeneous system architectures. SIGBED Rev. (2018). https://doi.org/10.1145/3199610.3199614.

Ashwin M. Aji, Antonio J. Pena, Pavan Balaji, Wu-Chun Feng. MultiCL: Enabling automatic scheduling for task-parallel workloads in OpenCL. Parallel Computing (2016) https://doi.org/10.1016/j.parco.2016.05.006.

J. Lee, M. Samadi and S. Mahlke, Orchestrating Multiple Data-Parallel Kernels on Multiple Devices, 2015 International Conference on Parallel Architecture and Compilation (PACT), 2015, pp. 355-366, https://doi.org/10.1109/PACT.2015.14.

Ben Taylor, Vicent Sanz Marco and Zheng Wang. 2017. Adaptive optimization for OpenCL programs on embedded heterogeneous systems. SIGPLAN Not. 52, 5 (May 2017), 11-20. https://doi.org/10.1145/3140582.3081040.

Ragan-Kelley J, Barnes C, Adams A, Paris S, Durand F, Amarasinghe S. 2013. Halide: a language and compiler for optimizing parallelism, locality, and recomputation in image processing pipelines. ACM Conference on Programming Language Design and Implementation (PLDI). https://doi.org/10.1145/2491956.2462176.

Chen T, Moreau T, Jianf Z, Zheng L, Yan E, Shen H, Cowan M, Wang L, Hu Y, Ceze L, Guestrin C. 2018. TVM: An automated end-to-end optimizing compiler for deep learning. USENIX Symposium on Operating Systems Design and Implementation (OSDI). https://www.usenix.org/conference/osdi18/presentation/chen.

Zhou Y, Roy S, Abdolrashidi A, Wong D, MA PC, Xu Q, Zhong M, Liu H, Goldie A, Mirhoseini A, Laudon J. 2019. GDP: Generalized device placement for dataflow graphs. arXiv preprint. https://arxiv.org/abs/1910.01578.

Tal Ben-Nun, Alice Shoshana Jakobovits, Torsten Hoefler Neural Code Comprehension: A Learnable Representation of Code Semantics. In Neural information processing systems (NeurIPS) 2018.

J Schulman, F Wolski, P Dhariwal, a Radford, O Klimov. 2017. Proximal policy optimization algorithms. arXiv preprint. https://arxiv.org/abs/1707.06347.

Kraska T, Beutel A, Chi EH, Dean J, Polyzotis N. 2018. The case for learned index structures. International Conference on Management of Data (SIGMOD). https://doi.org/10.1145/3183713.3196909.

Kipf, Thomas N., and Max Welling. "Semi-supervised classification with graph convolutional networks." arXiv preprint arXiv:1609.02907 (2016).

Von Luxburg, Ulrike. "A tutorial on spectral clustering." Statistics and computing 17, No. 4 (2007): 395-416.

Xiong, Tao, Liang Zhu, Ruofan Wu and Yuan Qi. "Memory Augmented Design of Graph Neural Networks." In ICLR 2020.

Alon, Uri, and Eran Yahav. On the bottleneck of graph neural networks and its practical implications. arXiv preprint arXiv:2006.05205 (2020).

Moon, Seungwhan, Pararth Shah, Anuj Kumar, and Rajen Subba. "Memory graph networks forexplainable memory-grounded question answering." In Proceedings of the 23rd Conference on Computational Natural Language Learning (CoNLL), pp. 728-736. 2019.

Zhang C, Song W, Cao Z, Zhang J, Tan PS, Chi X. 2020. Learning to Dispatch for Job Shop Scheduling via Deep Reinforcement Learning. Advances in Neural Information Processing Systems (NeurIPS). https://papers.neurips.cc/paper/2020/hash/11958dfee29b6709f48a9ba0387a2431-Abstract.html.

* cited by examiner

EXECUTION PLACEMENT OF A COMPUTER PROGRAM USING A TRAINED MACHINE-LEARNING MODEL

BACKGROUND

The use of heterogeneous computing has become ubiquitous with respect to concepts that improve or optimize performance, power usage, and silicon area. In this context, heterogeneity refers to pairing CPUs (Central Processing Units) with other hardware devices (e.g., artificial intelligence or networking accelerators, also known collectively as XPUs). Programming models such as Intel® oneAPI facilitate the use of heterogeneous hardware by providing a uniform interface that abstracts away the unnecessary details of different types of devices. Developers can thus write code that will run on any device available.

At the same time, selecting the device usually is a manual task that developers are responsible for. For example, Intel oneAPI built-in device selectors do not consider the workload, leaving device selection to the developer, as opposed to adapting the "three pillars concept for machine programming" to the hardware. Manual selection may lead to a suboptimal utilization of resources, with outcomes such as a longer runtime or higher energy usage than ideal. Automated approaches such as those based on deep learning eliminate the need of manual selection, but typically do not consider dynamic execution environments. Precisely, most of the deep learning approaches for device placement are trained on datasets containing instances of placement decisions for a particular heterogeneous execution environment and do not consider scenarios in which the execution environment during deployment could be different than that during training.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
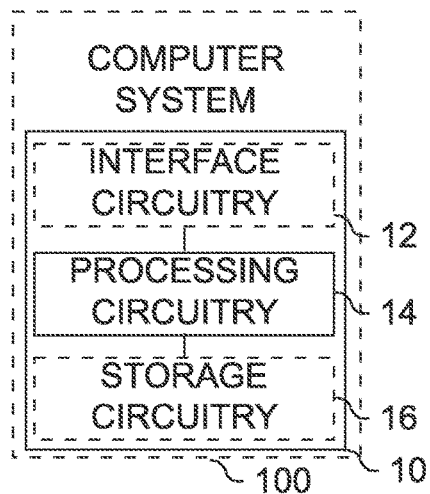
FIG. 1a shows a block diagram of an example of an apparatus or device and of a computer system comprising the apparatus or device.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "in-eluding", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

In the following description, specific details are set forth, but examples of the technologies described herein may be practiced without these specific details. Well-known circuits, structures, and techniques have not been shown in detail to avoid obscuring an understanding of this description. "An example/example," "various examples/examples," "some examples/examples," and the like may include features, structures, or characteristics, but not every example necessarily includes the particular features, structures, or characteristics.

Some examples may have some, all, or none of the features described for other examples. "First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform, or resource, even though the instructions contained in the software or firmware are not actively being executed by the system, device, platform, or resource.

The description may use the phrases "in an example/example," "in examples/examples," "in some examples/examples," and/or "in various examples/examples," each of which may refer to one or more of the same or different examples. Furthermore, the terms "comprising," "including," "having," and the like, as used with respect to examples of the present disclosure, are synonymous.

FIG. 1a shows a block diagram of an example of an apparatus 10 or device 10, and of a computer system 100 comprising the apparatus 10 or device 10. The apparatus 10 comprises circuitry that is configured to provide the functionality of the apparatus 10. For example, the apparatus 10 of FIG. 1a comprises (optional) interface circuitry 12, processing circuitry 14 and (optional) storage circuitry 16. For example, the processing circuitry 14 may be coupled with the interface circuitry 12 and with the storage circuitry 16. For example, the processing circuitry 14 may be configured to provide the functionality of the apparatus, in conjunction with the interface circuitry 12 (for exchanging information) and the storage circuitry (for storing information) 16. Likewise, the device 10 may comprise means that is/are configured to provide the functionality of the device 10. The components of the device 10 are defined as component means, which may correspond to, or implemented by, the respective structural components of the apparatus 10. For example, the device 10 of FIG. 1a comprises means for processing 14, which may correspond to or be implemented by the processing circuitry 14, (optional) means for communicating 12, which may correspond to or be implemented by the interface circuitry 12, and (optional) means for storing information 16, which may correspond to or be implemented by the storage circuitry 16.

The processing circuitry or means for processing 14 is configured to generate a graph representation of a computer program. The processing circuitry or means for processing 14 is configured to generate, using a first machine-learning model, a vector embedding of the graph representation of the computer program. The processing circuitry or means for processing 14 is configured to determine, based on an output of a second machine-learning model, a placement of an execution of the computer program on one or more hardware devices of a heterogenous plurality of hardware devices 105 of a computer system. The vector embedding and information on the load of the hardware devices are provided as input to the second machine-learning model.

FIG. 1a further shows the computer system 100 comprising the apparatus or device 10 and the heterogeneous plurality of hardware devices 105.

Figure 1B:
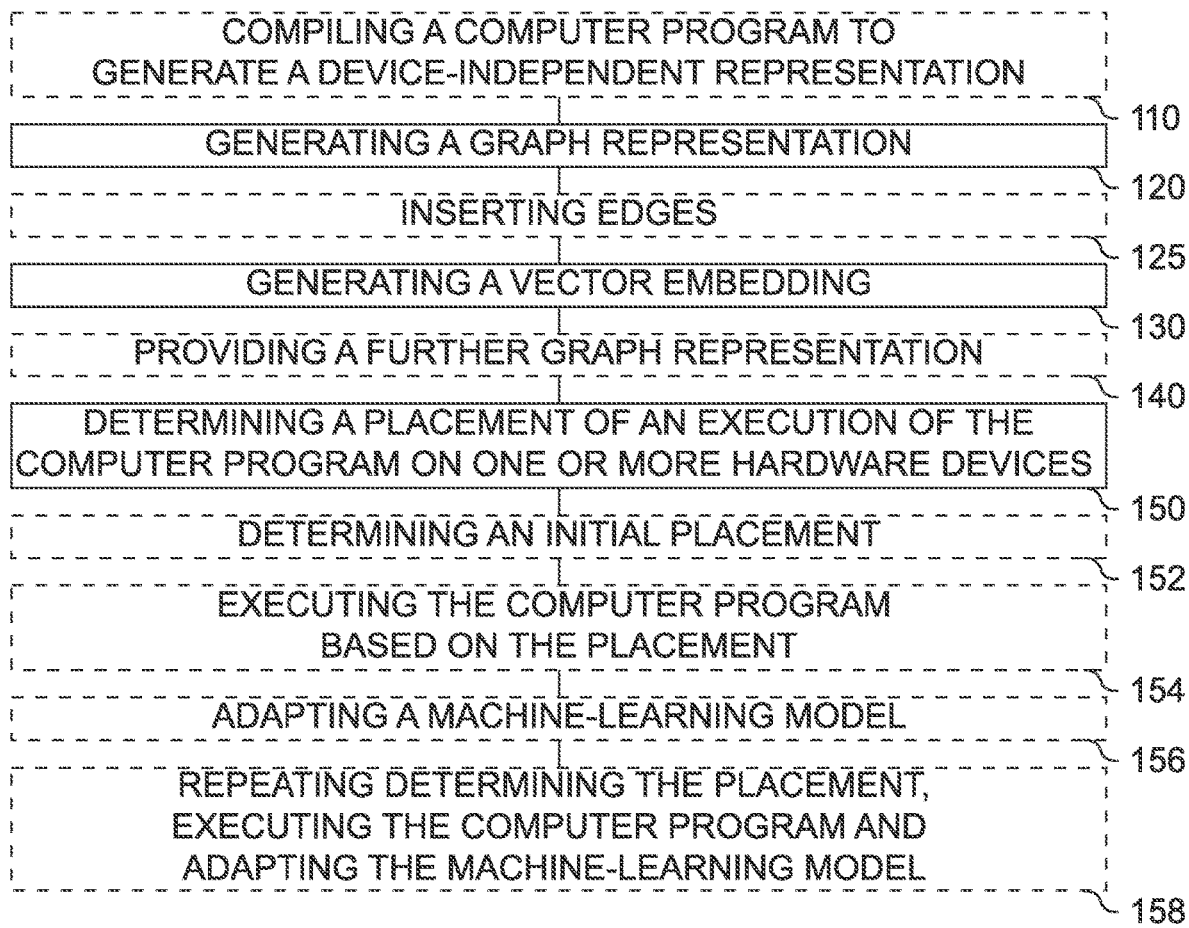
FIG. 1b shows a flow chart of an example of a method for determining a placement of an execution of the computer program.

FIG. 1b shows a flow chart of an example of a corresponding (computer-implemented) method for determining a placement of an execution of the computer program. The method comprises generating 120 the graph representation of a computer program. The method comprises generating 130, using the first machine-learning model, the vector embedding of the graph representation of the computer program. The method comprises determining 150, based on the output of the second machine-learning model, the placement of the execution of the computer program on one or more hardware devices of the heterogenous plurality of hardware devices of a computer system. The vector embedding and information on the load of the hardware devices are provided as input to the second machine-learning model.

In the following, the functionality of the apparatus 10, the device 10, the method and of a corresponding computer program is introduced in connection with the apparatus 10. Features introduced in connection with the apparatus 10 may be likewise included in the corresponding device 10, method and computer program.

The proposed concept relates to an apparatus, device, method, and computer program that is used to determine a placement of an execution of the computer program on one or more hardware devices of a heterogenous plurality of hardware devices of a computer system. The proposed entities are used to determine, which of the heterogeneous plurality of hardware devices is to be used to execute the computer program. In other words, the processing circuitry is configured to select, among the heterogeneous plurality of hardware devices, one or more hardware devices to be used for executing the computer program. The placement of the execution of the computer program thus relates to a selection of one or more hardware devices among the heterogeneous plurality of hardware devices.

In the present disclosure, the computer system comprises a heterogeneous plurality of hardware devices. In other words, the computer system comprises at least two different hardware devices, e.g., at least two hardware devices having different capabilities in terms of computational performance, latency, memory etc. In this context, heterogenous means, that the plurality of hardware devices is not limited to hardware devices having the same capabilities but includes different hardware devices having different capabilities. For example, the heterogeneous plurality of hardware devices may comprise at least two of one or more central processing units (CPUs), one or more accelerator cards (e.g., neural accelerators), one or more graphics processing units (GPUs) and one or more field-programmable gate arrays (FPGAs). Moreover, the different CPUs, GPUs, accelerator cards and FPGAs may, amongst each other, have different capabilities. For example, the computer system may comprise two GPUs, with one of the GPUs having twice the memory or twice the computational capabilities of the other GPU.

The proposed concept thus relates to a placement of the execution of the computer program on different hardware devices having different capabilities. In the present disclosure, a graph-based approach to the placement is proposed. Thus, the proposed concept starts with determining, i.e., generating, the graph representation of the computer program. To generate the graph-based representation (i.e., the graph of the graph-based representation) of the computer program, the processing circuitry may be configured to generate the graph representation with a plurality of vertices and a plurality of edges. For example, the graph representation may represent an interdependence of various components (e.g., instructions and variables/constants) of the computer program. The instructions and variables/constants may be the vertices (i.e., nodes) of the graph, and the interdependence between the instructions and variables/constants may be expressed as the edges of the graph. In other words, the plurality of vertices may represent instructions, variables, and constants of the computer program. The processing circuitry may be configured to insert edges representing control flow of the computer program, edges representing data flow of the computer program, edges representing call flow of the computer program and edges modeling memory dependencies among instructions into the graph representation. Accordingly, as further shown in FIG. 1b, the method may comprise inserting edges 125 representing control flow of the computer program, edges representing data flow of the computer program, edges representing call flow of the computer program and edges modeling memory dependencies among instructions into the graph representation. In other words, the graph representation may be generated based on control flow, data flow, call flow and memory dependencies of the computer program. For example, the graph-based representation may be a control-data-call-memory flow graph (CDCM-FG).

To obtain the instructions, variables/constants, control flow, data flow, call flow and memory dependencies, at least one of the techniques "static analysis" and "dynamic analysis" may be used. In other words, the processing circuitry may be configured to generate the graph representation using at least one of static analysis and dynamic analysis. In static analysis, the code, or an intermediate representation of the code (e.g., a bytecode representation generated by a compiler) is analyzed, without execution of the code, to determine the instructions, variables/constants, and the various flows between the components. Accordingly, the processing circuitry may be configured to generate the graph representation of the computer program based on source code of the computer program or based on a device-independent representation of the computer program (i.e., a representation that is not optimized for a predefined architecture or computer program). For example, the processing circuitry may be configured to compile the computer program, e.g., using the Low-Level Virtual Machine (LLVM), to generate a device-independent intermediate representation, i.e., a device-independent bytecode, such as the LLVM Intermediate Representation (LLVM IR) or the Standard Portable Intermediate Representation (SPIR/SPIR-V). The corresponding method may comprise, as shown in FIG. 1b, compiling 110 the computer program to generate a device-independent intermediate representation. For example, the processing circuitry may be configured to perform the static analysis based on the source code or based on the device-independent representation. In dynamic analysis, at least a portion of the computer program is being executed, with the runtime values of the dynamic analysis being used to better trace the flows between the components (e.g., by giving higher weights to flows that are more often triggered during execution of the computer program, or by disregarding or discounting flows that never or rarely occur). Moreover, the dynamic analysis may be based on given input values of the computer program.

The graph representation of the computer program is the starting point for the proposed concept. However, while the graph representation is a useful representation of the computer program, it contains aspects that may be less relevant for the subsequent placement, and other aspects may be overlooked as they are not obvious from the graph representation alone. Therefore, machine-learning is used to generate a so-called vector embedding of the graph representation. In other words, the processing circuitry is configured to generate, using the first machine-learning model, the vector embedding of the graph representation of the computer program. In machine-learning, an embedding is obtained by transforming input data from a higher-dimensional input space to output data or intermediate data in a lower-dimensional output space. In the present disclosure, the graph representation of the computer program is a representation in the higher-dimensional input space (as graphs, and in particular graphs representing computer programs, can be highly complex), and the vector embedding is a representation in the lower-dimensional output space (as the vector embedding is merely a vector that represents the graph representation of the computer program). In other words, the vector embedding is a vector comprising a plurality of integer or floating-point numbers, with the vector embedding representing the graph representation, and thus the computer program. Since the first machine-learning model takes the graph-representation of the computer program as input, i.e., it takes a graph as input, the first machine-learning model may be first graph-based machine-learning model. Accordingly, the input of the first (graph-based) machine-learning model may be a graph, and the output may be a vector representing an embedding. For example, the first machine-learning model may be a graph neural network (GNN) and in particular a graph convolutional network (GCN). A more detailed implementation of the first machine-learning model is introduced in connection with FIG. 4, where the first machine-learning model is denoted in context with a "graph learning module". For example, as shown in connection with FIG. 4, the first machine-learning model may be a multi-layer GCN with a layer-wise propagation rule.

Due to the reduction in dimensionality, less-relevant aspects may be less represented in the vector embedding. However, more-relevant aspects may be emphasized in the vector embedding. In particular, two aspects of the graph representation of the computer program may be emphasized in the vector embedding—the hierarchical structure of the graph representation, and a so-called "community" between the components of the hierarchical structure, i.e., the "hierarchical community structure". The hierarchical structure of the graph representation of the computer program may be derived from the vertices and edges of the graph representation, e.g., by transforming the graph-based representation of the computer program as tree structure, with the hierarchical structure being defined between the root of the tree structure and the leaves of the tree structure. The hierarchical community structure is built upon this hierarchical structure. In general, the "community" of the hierarchical community structure may represent how closely interrelated two components of the hierarchical structure are. The "community" of the hierarchical community structure may be determined using clustering, by clustering components of the hierarchical structure together that form a community, e.g., due to a large number or a high importance of flows between the components. For example, a technique called "spectral clustering" may be used to determine the hierarchical community structure. In other words, the first graph-based machine-learning model may be trained to determine a hierarchical community structure of the graph representation using clustering, e.g., using spectral clustering. In other words, the components of the hierarchical structure may be clustered into communities, i.e., subsets of the hierarchical structure that have a high number of flows in between them. The vector embedding may represent the hierarchical community structure of the graph representation.

Figure 2A:
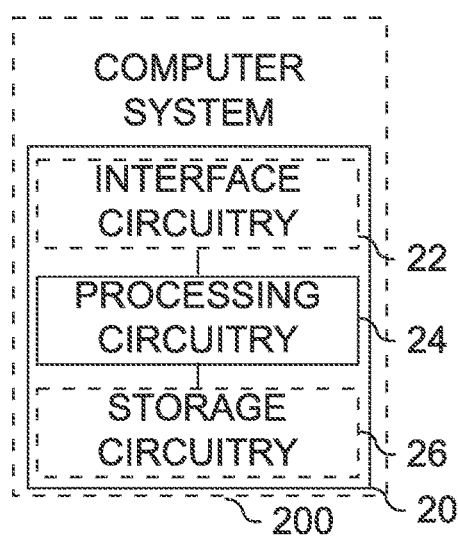
FIG. 2a shows a flow chart of an example of a method for training a machine-learning model for determining a placement of an execution of a computer program.
Figure 2B:
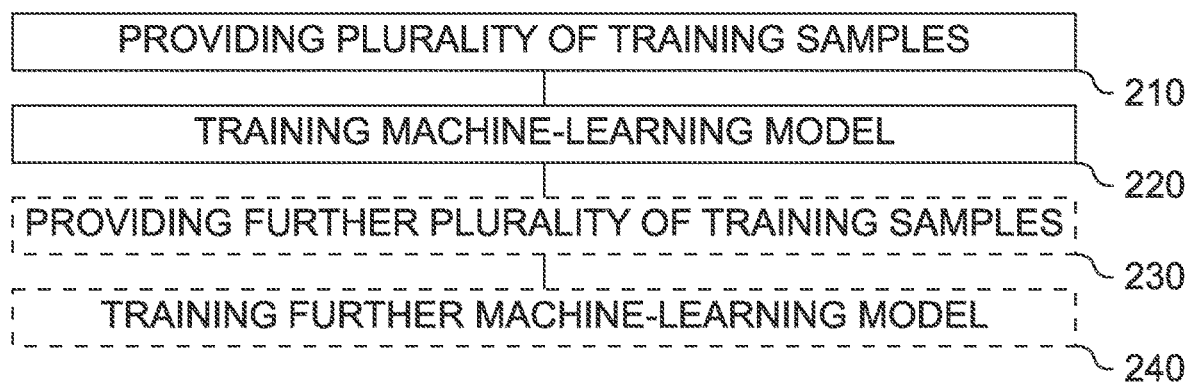
FIG. 2b shows a block diagram of an example of an apparatus or device for training a machine-learning model for determining a placement of an execution of a computer program and of a computer system comprising the apparatus or device.
Figure 3:
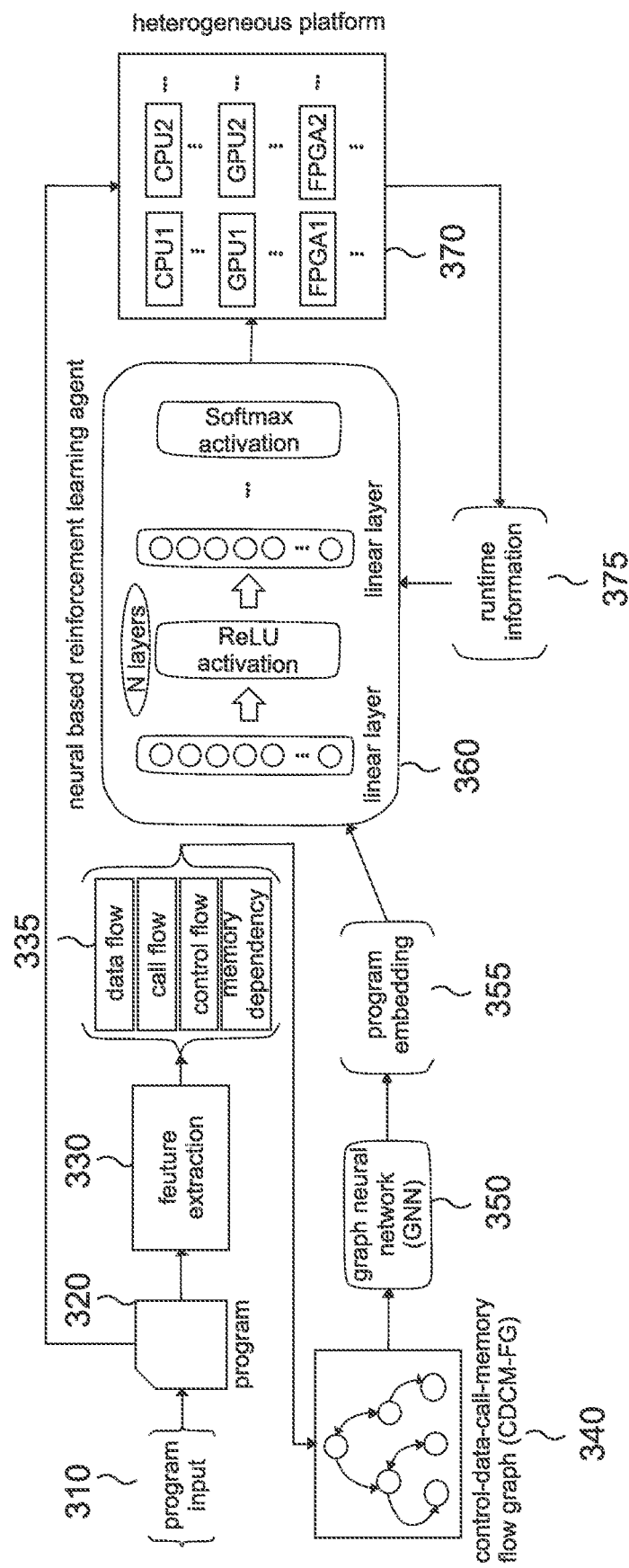
FIG. 3 shows a schematic diagram of an overview of a system according to an example.
Figure 4:
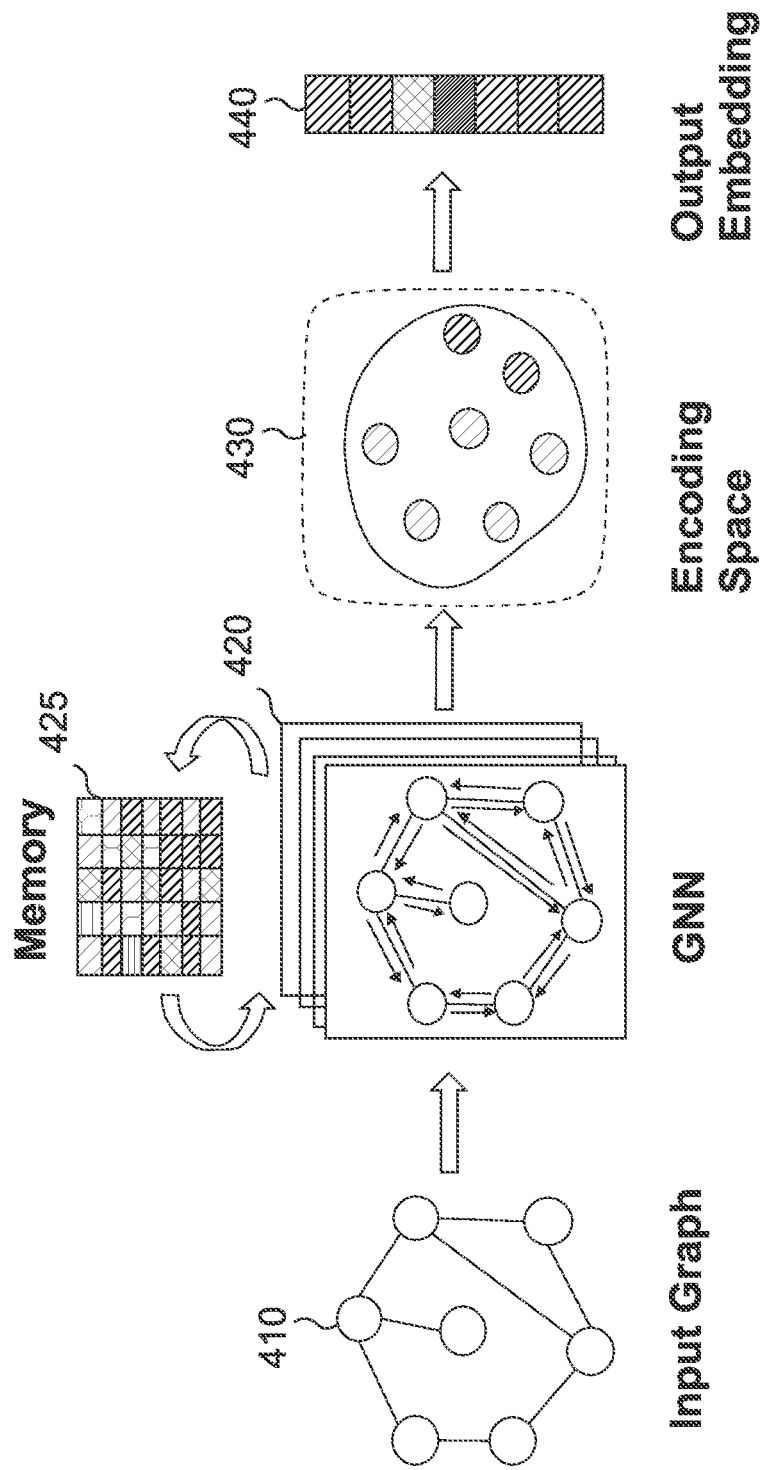
FIG. 4 shows a schematic diagram of an example of graph learning with a memory-augmented Graph Neural Network.

More details with respect to the training of the first machine-learning model is given in connection with FIGS. 2a to 2b and in connection with FIGS. 3 to 7, and in particular FIG. 4. For example, the processing circuitry may be configured to train the first machine-learning model using a plurality of training samples, with each sample of the plurality of plurality of further training samples comprising the graph representation of a computer program. Unsupervised learning or semi-supervised learning may be used to perform the training, e.g., to train the first machine-learning model to apply clustering during the determination of the vector embedding. In various examples, the first machine-learning model is trained together with the second machine-learning model using end-to-end training, i.e., input being used for the second machine-learning model are generated using the first machine-learning model. Accordingly, the first machine-learning model may be trained using reinforcement learning. Alternatively, the first machine-learning model may be a pre-trained machine-learning model.

In various examples, the first machine-learning model may be used in conjunction with a memory that is external to the first machine-learning model, and that can be accessed by various layers of the first machine-learning model. In other words, the first graph-based machine-learning model may be coupled with memory. In particular, the hierarchical structure of the graph representation may be stored in said memory. The hierarchical structure of the graph representation may be accessible (e.g., modifiable) in the memory by the layers of the first graph-based machine-learning model.

The vector embedding and information on the load of the hardware devices are provided as input to the second machine-learning model. The second machine-learning model is trained to provide an output representing a placement of the execution of the computer program on the heterogeneous plurality of hardware devices. For example, the output of the second machine-learning model may be a vector, with each position of the vector indicating whether a hardware device of the heterogeneous plurality of hardware devices is to be used for executing the computer program. The processing circuitry is then configured to determine, based on the output of the second machine-learning model, the placement of the execution of the computer program on the one or more hardware devices of a heterogenous plurality of hardware devices of a computer system. In other words, the processing circuitry may be configured to select, based on the output of the second machine-learning model, the one or more hardware devices to be used for executing the computer program among the heterogeneous plurality of hardware devices. For example, the second graph-based machine-learning model may be a multi-layer feed-forward neural network with nonlinearities and a softmax output layer, e.g., as shown in connection with FIGS. 3, 5 and 6.

Figure 6:
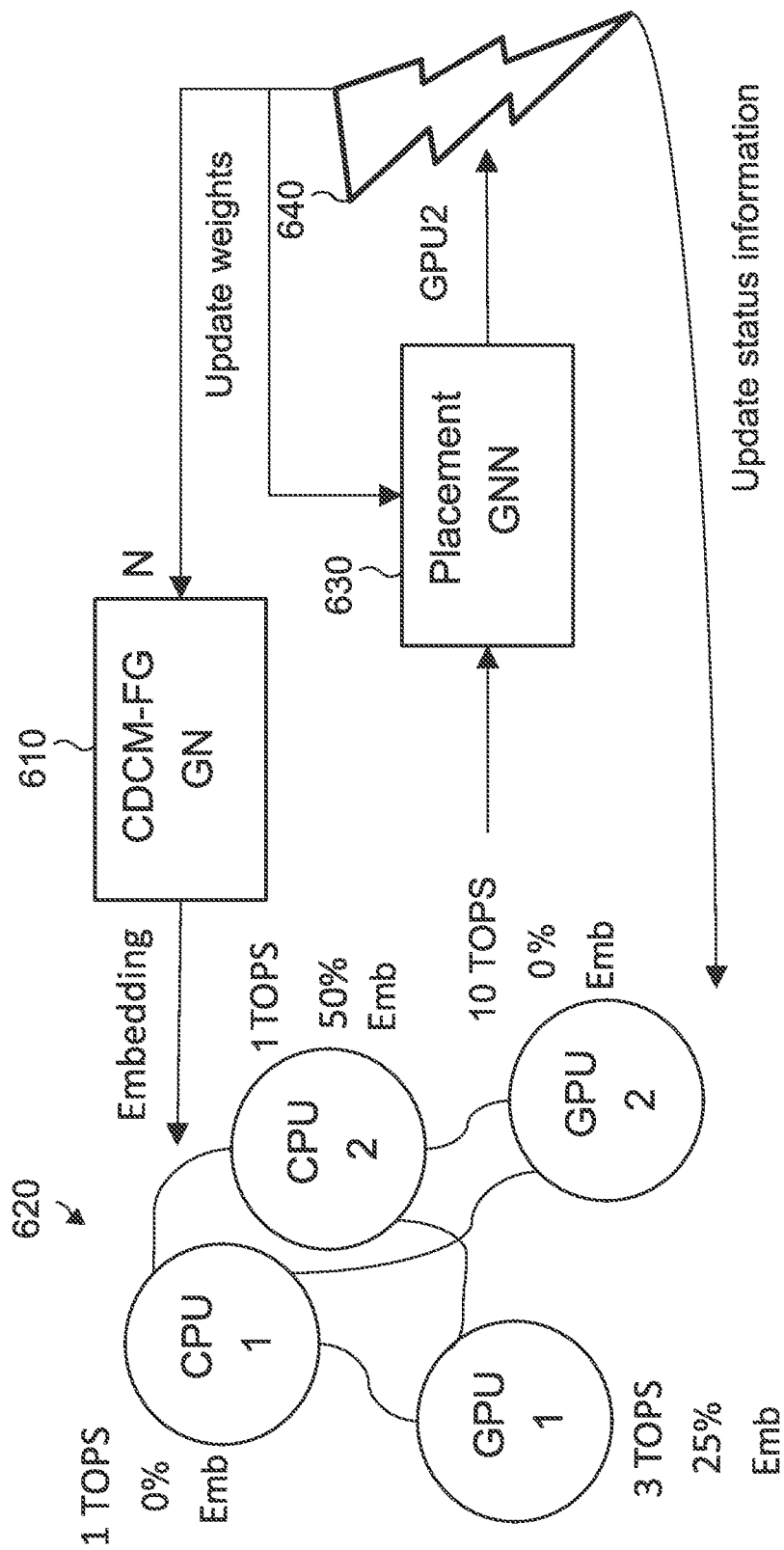
FIG. 6 shows a schematic diagram of an end-to-end training example with a Graph Neural Network reinforcement learning policy.

In various examples, the second machine-learning model is a second graph-based machine-learning model. In particular, information on the heterogeneous plurality of hardware devices, and the information on the dynamic load of the hardware devices, may be provided as further graph-based representation to the second machine-learning model. For example, the processing circuitry may be configured to provide (e.g., generate and provide) a further graph representation of the heterogeneous plurality of hardware devices as input to the second machine-learning model. Accordingly, as shown in FIG. 1*b*, the method may comprise providing 140 a further graph representation of the heterogeneous plurality of hardware devices as input to the second machine-learning model. For example, as shown in FIG. 6, the vertices of the further graph representation may represent the hardware devices and the edges of the further graph representation may represent the transfer capabilities between the hardware devices. For example, the further graph representation comprising the information on the dynamic load of the hardware devices. In particular, as further shown in FIG. 6, the information on the dynamic load of the hardware devices may be included in the further graph representation as labels of the vertices of the further graph representation (where the processing capabilities (in Tera Operations Per Second, TOPS) and the load (in percent) are included as labels of the vertices).

In some examples, as further elaborated in connection with FIG. 6, the further graph representation may be based on a device-independent graph, with processing capabilities of the heterogeneous plurality of hardware devices being included in the device-independent graph as labels of the vertices of the further graph representation (TOPS in FIG. 6). In other words, the device-independent graph may comprise a pre-determined number of vertices and edges, with the number of vertices being independent of, and possibly different from, the number of hardware devices of the heterogeneous plurality of hardware devices. For each of the hardware devices, a vertex may be annotated with a label indicating the processing capabilities of the hardware device. Vertices that are not assigned a label may be assigned an empty label, indicating that this vertex represents a hardware device with zero processing capabilities (meaning that this vertex is not to be considered during the placement, as it does not represent an actual hardware device). The second machine-learning model may be trained to determine the placement based on the device-independent graph and the labels indicating the processing capabilities of the hardware devices.

The second machine-learning model may be adapted (i.e., trained or further trained) during the placement process. In particular, reinforcement learning may be used during the placement process in order to iteratively tweak the placement according to a given reward function, in order to achieve better and better placements over the iterations, starting from an initial placement. In other words, the processing circuitry may be configured to determine the placement of the execution of the computer program by determining an initial placement using the second machine-learning model, executing the computer program using the one or more hardware devices as selected by the initial placement, adapting (i.e., re-training) the second machine-learning model (i.e., the weights of the underlying neural network) using reinforcement learning based on runtime metrics (such as the runtime duration of a benchmark component of the computer program or an energy usage during the runtime of the benchmark component of the computer program) of the execution of the computer program, and repeating the determining of the placement, execution of the computer program and adaptation of the second machine-learning model until a termination condition is met. Accordingly, as further shown in FIG. 1*b*, the method may comprise determining 150 the placement of the execution of the computer program by determining 152 an initial placement using the second machine-learning model, executing 154 the computer program using the one or more hardware devices as selected by the initial placement, adapting 156 the second machine-learning model using reinforcement learning based on runtime metrics of the execution of the computer program, and repeating 158 the (process of) determining of the placement, execution of the computer program and adaptation of the second machine-learning model until a termination condition is met. For example, the termination may be met when the execution of the computer program is completed, or after a pre-defined number of iterations of the process of determining of the placement, execution of the computer program and adaptation of the second machine-learning model. In some examples, the second machine-learning model and the first machine-learning model may be adapted in an end-to-end fashion, i.e., together, such that the weights of both neural networks are adapted at the same time.

In reinforcement learning, one or more software actors (called "software agents") are trained to take actions in an environment. In the present context, the one or more software agents are trained to assign the computer program to the one or more hardware devices. Based on the taken actions, a reward is calculated. Reinforcement learning is based on training the one or more software agents to choose the actions such, that the cumulative reward is increased, leading to software agents that become better at the task they are given (as evidenced by increasing rewards). This reward, in turn, is based on a so-called reward function, which is used to judge the outcome of the respective iteration, i.e., of the actions taken by the software agents. In the present context, the reward function may be based on at least one of a runtime duration of the execution of the computer program and an energy usage of the execution of the computer program.

Machine-learning algorithms are usually based on a machine-learning model. In other words, the term "machine-learning algorithm" may denote a set of instructions that may be used to create, train, or use a machine-learning model. The term "machine-learning model" may denote a data structure and/or set of rules that represents the learned knowledge, e.g., based on the training performed by the machine-learning algorithm. In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the first and second machine-learning models may be an artificial neural network (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e., to achieve a desired output for a given input. In at least some embodiments, the first and second machine-learning models may be deep neural networks, e.g., a neural network comprising one or more layers of hidden nodes (i.e., hidden layers), preferably a plurality of layers of hidden nodes.

Alternatively, the first and second machine-learning models may be support vector machines. Support vector machines (i.e., support vector networks) are supervised learning models with associated learning algorithms that may be used to analyze data, e.g., in classification or regression analysis. Support vector machines may be trained by providing an input with a plurality of training input values that belong to one of two categories. The support vector machine may be trained to assign a new input value to one of the two categories. Alternatively, the first and second machine-learning models may be Bayesian networks, which are probabilistic directed acyclic graphical models. A Bayesian network may represent a set of random variables and their conditional dependencies using a directed acyclic graph. Alternatively, the machine-learning models may be based on a genetic algorithm, which is a search algorithm and heuristic technique that mimics the process of natural selection.

More details on the machine-learning models, and the training thereof, is discussed with respect to FIGS. 2a to 2b and 4 to 6.

The interface circuitry 12 or means for communicating 12 of FIG. 1a may correspond to one or more inputs and/or outputs for receiving and/or transmitting information, which may be in digital (bit) values according to a specified code, within a module, between modules or between modules of different entities. For example, the interface circuitry 12 or means for communicating 12 may comprise circuitry configured to receive and/or transmit information.

For example, the processing circuitry 14 or means for processing 14 of FIG. 1a may be implemented using one or more processing units, one or more processing devices, any means for processing, such as a processor, a computer or a programmable hardware component being operable with accordingly adapted software. In other words, the described function of the processing circuitry 14 or means for processing may as well be implemented in software, which is then executed on one or more programmable hardware components. Such hardware components may comprise a general-purpose processor, a Digital Signal Processor (DSP), a micro-controller, etc.

For example, the storage circuitry 16 or means for storing information 16 of FIG. 1a may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the apparatus 10, device 10, method, computer program, heterogeneous plurality of hardware devices 105 and computer system 100 are mentioned in connection with the proposed concept or one or more examples described above or below (e.g., FIGS. 2a to 7). The apparatus 10, device 10, method, computer program, heterogeneous plurality of hardware devices 105 and computer system 100 may comprise one or more additional optional features corresponding to one or more aspects of the proposed concept, or one or more examples described above or below.

FIG. 2a shows a flow chart of an example of a method for training a machine-learning model for determining a placement of an execution of a computer program. For example, the machine-learning model may correspond to the second machine-learning model introduced in connection with FIGS. 1a and 1b. The method comprises providing 210 a plurality of training samples for training the machine-learning model. Each training sample comprises a vector embedding of a graph representation of a computer program and information on the load of hardware devices of a heterogeneous plurality of hardware devices. The method comprises training 220 the machine-learning model using reinforcement learning, by determining an initial placement of an execution of the computer program on one or more of a heterogenous plurality of hardware devices based on an output of the machine-learning model, executing the computer program using the one or more hardware devices as selected by the placement, adapting the second machine-learning model using reinforcement learning based on runtime metrics of the execution of the computer program, and repeating the (process of) determining of the placement, execution of the computer program and adaptation of the machine-learning model until a termination condition is met.

FIG. 2b shows a block diagram of an example of a corresponding apparatus 20 or device 20 for training a machine-learning model for determining a placement of an execution of a computer program and of a computer system comprising the apparatus or device. The apparatus 20 comprises circuitry that is configured to provide the functionality of the apparatus 20. For example, the apparatus 20 of FIG. 2b comprises (optional) interface circuitry 22, processing circuitry 24 and (optional) storage circuitry 26. For example, the processing circuitry 24 may be coupled with the interface circuitry 22 and with the storage circuitry 26. For example, the processing circuitry 24 may be configured to provide the functionality of the apparatus, in conjunction with the interface circuitry 22 (for exchanging information) and the storage circuitry (for storing information) 26. Likewise, the device 20 may comprise means that is/are configured to provide the functionality of the device 20. The components of the device 20 are defined as component means, which may correspond to, or implemented by, the respective structural components of the apparatus 20. For example, the device 20 of FIG. 2b comprises means for processing 24, which may correspond to or be implemented by the processing circuitry 24, (optional) means for communicating 22, which may correspond to or be implemented by the interface circuitry 22, and (optional) means for storing information 26, which may correspond to or be implemented by the storage circuitry 26. The processing circuitry 24 or means for processing 24 is configured to perform the method of FIG. 2a, e.g., in conjunction with the interface circuitry 22 or means for communicating 22 and/or the storage circuitry 26 or means for storing information 26.

For example, the apparatus 20 or device 20 may correspond to the apparatus 10 or device 10 introduced in connection with FIG. 1a. In other words, the apparatus 10 or device 10 of FIG. 1a may be further configured to perform the functionality of the apparatus 20 or device 20 of FIG. 2b. FIG. 2b further shows a computer system 200 comprising the apparatus 20 or device 20. For example, the computer system 200 may correspond to the computer system 100 introduced in connection with FIG. 1a. In particular, the computer system 200 may further comprise the heterogeneous plurality of hardware devices. If the computer system 200 is separate from the computer system 100 of FIG. 1a, it may form a system together with the computer system 100 of FIG. 1a.

In the following, the functionality of the apparatus 20, device 20, method and of a corresponding computer program is described in connection with the method of FIG. 2a. Features introduced in connection with the method may likewise be introduced in connection with the corresponding apparatus 20, device 20 and computer program.

While FIGS. 1a and 1b relate to the application of the machine-learning models with respect to the placement of the execution of the computer program, FIGS. 2a and 2b relate to a corresponding training process for at least the second machine-learning model referenced in FIGS. 1a and 1b. In this case, the described training relates to a training that is to be performed before the machine-learning model is being used to perform the placement. However, the same training can also be used during the placement, i.e., as part of the reinforcement learning-based adaptation of the (second) machine-learning model.

In general, machine learning refers to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and associated training content information, the machine-learning model "learns" to recognize the content of the images, so the content of images that are not included of the training images can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model.

Machine-learning models are trained using training input data. The examples specified above use a training method called "supervised learning". In supervised learning, the machine-learning model is trained using a plurality of training samples, wherein each sample may comprise a plurality of input data values, and a plurality of desired output values, i.e., each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm, e.g., a classification algorithm, a regression algorithm or a similarity learning algorithm. Classification algorithms may be used when the outputs are restricted to a limited set of values, i.e., the input is classified to one of the limited set of values. Regression algorithms may be used when the outputs may have any numerical value (within a range). Similarity learning algorithms are similar to both classification and regression algorithms but are based on learning from examples using a similarity function that measures how similar or related two objects are.

Apart from supervised or semi-supervised learning, unsupervised learning may be used to train the machine-learning model. In unsupervised learning, (only) input data might be supplied, and an unsupervised learning algorithm may be used to find structure in the input data, e.g., by grouping or clustering the input data, finding commonalities in the data. Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

In the present scenario, the machine-learning model is trained using reinforcement learning. In other words, the machine-learning model is trained by repeatedly, by the one or more software agents, determining a placement, evaluating the placement, adapting the machine-learning model, and repeating the process. In the present scenario, the placement is evaluated by executing the computer program using the one or more hardware devices as selected by the placement, determining the runtime metrics of the execution of the computer program, and evaluating the runtime metrics (e.g., based on a suitable reward function being used for calculating the reward). For example, the reward function may be based on at least one of a runtime duration of the execution of the computer program and an energy usage of the execution of the computer program. Accordingly, the machine-learning model is trained determining an initial placement of an execution of the computer program on one or more of a heterogenous plurality of hardware devices based on an output of the machine-learning model, executing the computer program using the one or more hardware devices as selected by the placement, adapting the second machine-learning model using reinforcement learning based on runtime metrics of the execution of the computer program, and repeating the determining of the placement, execution of the computer program and adaptation of the machine-learning model until the termination condition is met. As noted in connection with FIGS. 1a and/or 1b, the termination condition may be met after a pre-defined number of iterations of the process of determining of the placement, execution of the computer program and adaptation of the second machine-learning model, or if a pre-defined number of subsequent iterations yield an improvement that is lower than a desired improvement. For example, as further outlined in connection with FIGS. 1a and 1b, the machine-learning model may be trained to provide an output representing a placement of the execution of the computer program on the heterogeneous plurality of hardware devices.

As outlined above, the training of any machine-learning model is based on the provision of training samples. Therefore, the method comprise providing 210 the plurality of training samples for training the machine-learning model, with each training sample comprising a vector embedding of a graph representation of a computer program and information on the load of the hardware devices of the heterogeneous plurality of hardware devices. As is evident, the training samples are defined by two factors—the computer program, as represented by the vector embedding, and the load of the hardware devices of the heterogeneous plurality of hardware devices. Moreover, the second factor is defined by two sub-factors—the hardware devices making up the heterogeneous plurality of hardware devices, and the load of the hardware devices. In connection with FIGS. 1a and 1b, only a single computer program, a single combination of hardware devices and a single load of the hardware devices were being considered during the training. With respect to FIGS. 2a and 2b, a more general training is implemented, which takes into account variations in at least one of the factors (and sub-factors), e.g., in all three factors and sub-factors. In other words, the plurality of training samples may represent different computer programs, different heterogeneous combinations of hardware devices, and/or different load scenarios of the hardware devices. The method may comprise generating the plurality of training samples based on a plurality of different computer programs, with respect to a plurality of different combinations of hardware devices, and with respect to a plurality of different load scenarios. To model different combinations of hardware devices, the execution of the computer program may be performed on different computer systems comprising the different combinations of hardware devices, or on the same computer system restricting the hardware devices to a subset of the hardware devices comprised by the computer system. To model different load scenarios, load may be created artificially, e.g., using one or more dummy computer programs configured to cause processing load, memory load or communication load. The method may thus comprise generating a plurality of vector embeddings of graph representations of (different) computer programs and generating information on the load of the plurality of hardware devices based on a plurality of different combinations of hardware devices and based on a plurality of different load scenarios of the plurality of different hardware devices. The respective training samples may comprise information on the load scenario and combination of hardware devices to be used for executing the respective computer program.

For example, as discussed in combination with FIGS. 1a and 1b, the information on the load may be contained in a further graph representation of the heterogeneous plurality of hardware devices. Consequently, each training sample may comprise a further graph representation of the heterogeneous plurality of hardware devices, with the further graph representation comprising the information on the dynamic load of the hardware devices. Accordingly, the machine-learning model may be a graph-based machine-learning model. For example, the vertices of the further graph representation may represent the hardware devices and the edges of the further graph representation may represent the data transfer capabilities between the hardware devices. The information on the dynamic load of the hardware devices may be included in the further graph representation as labels of the vertices of the further graph representation. Moreover, information of the dynamic load on the data transfer capabilities between the hardware devices may be included in the further graph representation as labels of the edges of the further graph representation. This is another factors that can be used to augment the plurality of training samples, by varying the training samples with respect to the dynamic load of the data transfer capabilities. The method may comprise generating the respective further graph representation for each training sample. The subsequent execution of the computer program is then performed based on the combination of hardware devices and load scenario (with respect to processing capacity load and/or data transfer load) underlying the respective further graph representation.

In some examples, as mentioned in connection with FIGS. 1a and 1b, the further graph representation is based on a device-independent graph, with processing capabilities of the heterogeneous plurality of hardware devices being included in the further graph representation as labels of the vertices of the device-independent graph. Accordingly, the method may comprise generating the further graph representation as device-independent graph, e.g., for each of the hardware devices, a vertex of the graph representation may be annotated with a label indicating the processing capabilities (and with a label indicating the load) of the hardware device, with vertices not representing a hardware device being annotated with an empty label. The machine-learning model may be trained to determine the placement based on the device-independent graph and the labels indicating the processing capabilities of the hardware devices.

Each of the training samples is based on a vector embedding of a graph representation of the computer program. The generation of such a vector embedding, which represents the graph representation of the computer program, and thus the computer program, is discussed in connection with FIGS. 1a and 1b. For example, the vector embedding may represent a hierarchical community structure of the graph representation, and thus of the computer program. The vector embeddings being used for training the machine-learning model may be generated by generating the graph representation of the computer program and inputting the graph representation into the first machine-learning model introduced in connection with FIGS. 1a and 1b (e.g., without training the first machine-learning model at the same time). In various examples, however, the first machine-learning model (in the following denoted further machine-learning model) may be trained together with the machine-learning model (i.e., the second machine-learning model) using end-to-end-training. Examples for this approach are given in connection with FIGS. 5 and 6.

Accordingly, as further shown in FIG. 2a, the method may comprise providing 230 a further plurality of training samples for training a further machine-learning model, with each sample of the plurality of plurality of further training samples comprising the graph representation of the computer program. The method may comprise training 240 the further machine-learning model together with the machine-learning model, by training the further machine-learning model to provide the vector embedding of the graph representation of the computer program and using the vector embedding provided by the further machine-learning model within the plurality of training samples (being used to train the machine-learning model). In turn, during the reinforcement learning-based adaptation of the machine-learning model, the further machine-learning model is adapted as well, i.e., the weights of the neural networks of both the machine-learning model and the further machine-learning model may be adapted. For example, the further graph-based machine-learning model may be trained to determine a hierarchical community structure of the graph representation using spectral clustering. For example, in addition to the reinforcement learning-based adaptation of the further machine-learning model, unsupervised learning may be used to train the clustering capability of the further machine-learning model.

Consequently, the vector embeddings being used for the plurality of training samples are generated during the training process itself. In this case, the training starts by generating the graph-based representations of the different computer programs, which are then used to generate the further plurality of training samples. The output of the further machine-learning model is then provided, as part of the plurality of training samples, to the machine-learning model. Accordingly, providing the plurality of training samples may comprise providing the further plurality of training samples, and inputting the further plurality of training samples into the further machine-learning model to generate the vector embeddings for the plurality of training samples.

The generation of the graph-based representation of the computer program is described in connection with FIGS. 1a and 1b. To recapitulate, the graph-based representation of the computer program may comprise a plurality of vertices and a plurality of edges, with the plurality of vertices representing the instructions, variables, and constants of the computer program, and the plurality of edges comprising one or more edges representing a control flow of the computer program, one or more edges representing a data flow of the computer program, one or more edges representing a call flow of the computer program and one or more edges modeling a memory dependency among instructions.

Moreover, the further graph-based machine-learning model may be coupled with memory, with the hierarchical structure of the graph representation being stored in the memory and being accessible in the memory by the layers of the first graph-based machine-learning model.

The interface circuitry 22 or means for communicating 22 of FIG. 2b may correspond to one or more inputs and/or outputs for receiving and/or transmitting information, which may be in digital (bit) values according to a specified code, within a module, between modules or between modules of different entities. For example, the interface circuitry 22 or means for communicating 22 may comprise circuitry configured to receive and/or transmit information.

For example, the processing circuitry 24 or means for processing 24 of FIG. 2b may be implemented using one or more processing units, one or more processing devices, any means for processing, such as a processor, a computer or a programmable hardware component being operable with accordingly adapted software. In other words, the described function of the processing circuitry 24 or means for processing may as well be implemented in software, which is then executed on one or more programmable hardware components. Such hardware components may comprise a general-purpose processor, a Digital Signal Processor (DSP), a micro-controller, etc.

For example, the storage circuitry 26 or means for storing information 26 of FIG. 2b may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the apparatus 20, device 20, method, computer program and computer system 200 are mentioned in connection with the proposed concept or one or more examples described above or below (e.g., FIG. 1a to 1b, 3 to 7). The apparatus 20, device 20, method, computer program or computer system 200 may comprise one or more additional optional features corresponding to one or more aspects of the proposed concept, or one or more examples described above or below.

Various examples of the present disclosure relate to a system for automatic improved or optimized execution of code on heterogeneous hardware.

In the present disclosure, a system is introduced that may improve or optimize code execution in dynamic heterogeneous execution environments. Intuitively, an execution environment comprises the number and types of hardware devices and their state, such as configuration, usage, etc. There can be a variety of differences in the two execution environments such as 1) the sets of hardware devices in both the environments are exactly the same (i.e., the hardware devices and their configurations are same), but there is interference from other applications running on those devices during deployment that is missing during training (i.e., the usage of those devices is different), 2) the sets of hardware devices are different (i.e., the number or types of hardware devices are different). The proposed concept may be used even when the execution environment during deployment is different from the environment during training.

The proposed concept is based on two machine-learning models, a first machine-learning model for providing a vector embedding of a representation of a program, and a second machine-learning model for determining the placement of the program. Other concepts either solve only subproblems or use different techniques. For example, for learning representations of programs, approaches such as sequence learning approaches, like neural code comprehension (NCC), which uses recurrent neural networks, but also graph learning approaches, like the programmable graph representation Learning (PGL) framework and program graphs for machine learning (such as ProGraML) are used in other concepts. However, the existing concepts that learn program representations take, as input, code in a source language or by way of the abstract syntax tree and use language models like recurrent neural networks to learn the representation for the programs. Working directly with code sequences may put unnecessary emphasis on the names of variables that might not correlate with functionality of the code, while not being able to capture some structural or relational dependencies in the code. The works that do use graphs to represent code and apply machine learning methods on the graphs, like ProGraML, do not capture as much information as the proposed concept, such as input data to the program. Furthermore, the other concepts being used to learn program representations for device placement generally do not consider dynamic execution environments, where the environment during deployment could be different than the environment during training. Specifically, PGL, ProGraML and NCC are supervised learning approaches that train their deep learning models on two datasets containing instances of CPU/GPU placement decisions on specific execution environments. Intuitively, these approaches do not consider any changes to the execution environment, or in other words, the learned model is specific to the environment selected during training (or more specifically, the environment is considered while synthesizing the dataset itself).

For scheduling programs on heterogeneous hardware, some concepts propose a runtime controller for OpenCL (Open Computation Language) applications. Other concepts, such as MKMD (Multiple Kernels, Multiple Devices), allow scheduling multiple kernels on multiple devices. MultiCL is a proposed OpenCL extension that allows runtime scheduling. Other concepts use machine learning to schedule kernels to devices. Halide is a programming language for heterogeneous hardware that separates algorithms from scheduling. TVM is a compiler for machine learning models that targets heterogeneous hardware. Some concepts use a graph neural network along with reinforcement learning based approach that learns to optimize device placement for deep learning computational graphs. Some concepts may use the theoretical job shop scheduling problem using reinforcement learning. However, these approaches generally do not use graph representations of programs. For example, expert-selected program features are used, which is less generalizable than graph learning. If a reinforcement learning based approach and a graph neural network model is used, the trained models are specific to the execution environment considered during training and would need to be retrained in case the environment changes.

Graph neural networks (GNNs) have been shown as an effective technique to learn structured representation for graphs in various domains, including program graphs (see ProGraML). However, most of the existing GNNs have limitations in their expressiveness in capturing some important inherent structure of graphs, such as the hierarchical or long-range dependency information in graphs. GNNs have also been used to learn to run jobs on theoretical machines, however, with a graph representation that is specific to the job-shop scheduling problem, which is distinct from our problem. A memory mechanism has been explored in literature; however, it is designed for specific tasks and are not generalizable.

In the following, an implementation example is provided for the concept introduced in connection with FIGS. 1a to 2b.

Some examples of the proposed concept aim to provide a general memory-augmented GNN framework with an external memory coupled with GNN layers that can leverage various kinds of graph properties in the learning process. The proposed system uses machine learning techniques, such as reinforcement learning (RL) and GNNs, to predict the device where a program runs optimally (e.g., fastest or using least power). Unlike existing machine learning based systems for device placement, predictions made by the proposed system may consider dynamic runtime information about the heterogeneous hardware (e.g., available compute power, memory, etc.), reducing the need to re-train the system with changes to the execution environment. Moreover, the proposed system may build a graph representation of the program and its input.

Various examples of the present disclosure are based on the following components: A graph representation of programs based on a configurable combination of features extracted by static or dynamic analysis, a memory-augmented GNN (e.g., the first machine-learning model introduced in connection with FIGS. 1a and 1b) that uses an external memory to store the hierarchical structure of the graph and make it available in each neural network layer, and a (further) graph representation of the heterogeneous hardware reflecting the dynamic state of the execution environment.

The proposed concept may enhance application programming interfaces (APIs) for providing software for heterogeneous hardware, such as Intel® oneAPI, with the capability to automatically select the best set of XPUs based on runtime information, eliminating the need of manual selection based on domain expertise. With the technique presented in the present disclosures, developers may be able to realize better value of their heterogeneous hardware setup, thus reducing the time required for determining an improved version and increasing the utility of the respective implementations.

The proposed system, as shown in FIG. 3, takes as input a program specified as source code or another device-independent representation (e.g., LLVM IR, SPIR-V). FIG. 3 shows a schematic diagram of an overview of a system according to an example. First, the system builds a graph representation of the program that captures its complex structure. In particular, a program input 310 and the computer program 320 may be input into a feature extraction block 330, which builds a control-data-call-memory flow graph (CDCM-FG) 340 based on the data flow, call flow, control flow and memory dependency 335 extracted by the feature extraction block. Then, the system uses a GNN 350 to produce a vector embedding 355 of the program. Finally, the embedding 355 and runtime information 375 (such as device usage, i.e., load) are used by an RL agent (neural based reinforcement learning agent 360, which comprises a linear layer as input layer, N non-linear layers (such as Rectified Linear Unit layers), one or more further linear layers and a softmax activation output layer in the example of FIG. 3) to execute the program on an device 370 (comprising one or more CPUs, one or more GPUs, one or more FPGAs etc.) while increasing a reward (e.g., negative runtime or negative energy usage).

In the following, the graph construction module is discussed. In the proposed concept, a graph is used to represent the input program. Such a structured representation may be suitable for reasoning about programs. The proposed concept may build a graph using features from classical program analysis. Specifically, the proposed graph construction module (e.g., feature extraction block 330) may use the following: (i) control and (ii) data flows, (iii) call graphs, and (iv) memory dependencies (see block 335). Additionally, the proposed graph construction module may use both (v) static and (vi) dynamic program analysis. While these six features have been discussed, individual, with respect the other concepts, the proposed graph construction module may combine them all in a novel way. Below, an abbreviated analysis is presented, outlining some advantages of these six elements with respect to the solution space of the proposed concept.

First, control and data flow analysis can lead learned systems to identify different types of optimized hardware selection. For example, programs with large amounts of data flow might be best executed on systems with wide data flow channels (e.g., GPUs), while programs with large amounts of control flow may be best executed on systems with speculative execution and branch prediction (e.g., CPUs). By performing static analysis, the proposed system may (i) first learn general data and control heuristics for heterogeneous hardware. By then applying dynamic analysis, (ii) the learned heuristics can evolve its generalized decisions to be specialized (also known as "instance-optimized", as specified by Kraska et al. in "The Case for Learned Index Structures") for the heterogeneous hardware that is actually available in different and unpredictable environments.

Second, in heterogeneous systems, device-specific compilers may perform inter-procedural optimization, which alters the subroutine structure of the program, for example by in-lining subroutines. The call graph may be used to represent the relation between subroutines and their call sites and enable learning. This information is usually missing from the control flow analysis, which does not cross subroutine boundaries. Finally, memory dependency information extracted during dynamic analysis may be used for the graph to reflect the memory characteristics of devices (e.g., latency). Heterogeneous hardware may differ substantially between devices (e.g., CPUs have low latency but low bandwidth, GPUs have high bandwidth but higher latency). Therefore, it may be useful for the graph to pass this information to the learning module.

Given an input program, the proposed concept may pass the input program through a compiler, such as the LLVM (Low-Level Virtual Machine) compiler to produce an intermediate representation (IR). Then, a graph (i.e., the graph-based representation) may be constructed from the intermediate representation. Specifically, a control-data-call-memory flow graph (CDCM-FG) may be considered as a directed graph G=(V, E), where each node v denotes an LLVM IR instruction or variable/constant, and directed edges are inserted between nodes to encode one or more of the following dependencies: (1) Control Flow: the dependency between an instruction and its control successor(s); (2) Data Flow: the dependency between the variables (and constants) and the instructions that use them or produce them; (3) Call Flow: the dependency between a statement that calls a function and the function being called; and (4) Memory Dependency: the store and load dependencies To construct the graph, static or dynamic analysis may be used to model the information flow in programs. A full-flow graph may be constructed by inserting a graph node for each instruction. Then, edges and further nodes corresponding to the dependencies that are to be include may be inserted. Control and data flow edges may be inserted between instruction nodes. Additional graph nodes may be introduced for constant values and variables, and data-flow edges may be added between constants/variables and the instructions that use them as operands or the instructions that produce the variables. The call edges may be added to capture the relation between a statement that calls a function and the called function, by inserting an outgoing call edge from the calling statement to the calling statement. Finally, edges between the store-load instructions may be added to capture the memory dependency among instructions. In the graph constructed, each node v may have an attribute indicating the type of the node (e.g., add, sub, store, or load), and each edge e may have an attribute indicating the type of dependencies it represents (I.e., control, data, call, or memory).

The proposed graph construction module may provide a general approach to construct a graph representation for code. When choosing whether to use dynamic analysis for constructing the graph, there is a tradeoff between the amount of time/effort spent on the analysis and the richness of information to be encoded in the graph. Dynamic analysis requires executing the program with inputs and collecting the representative dynamic trace generated from the execution. However, the graph constructed based on this dynamic analysis may consider the input and run-time information, which may better capture the dependencies between instructions, therefore it may tend to contain richer information compared to graphs built only from static analysis.

In the following, the graph learning module is discussed. This module uses a GNN (e.g., the first machine-learning model introduced in connection with FIGS. 1a and 1b) to learn a vector embedding of the graph representing the program. To better capture the code structural and semantic relationships from the CDCM-FG graph, a memory-augmented GNN framework is proposed that uses an external memory to store and leverage graph structure information for the representation learning. Augmenting a GNN with memory may improve its ability to assimilate new data rapidly, which is important for the proposed system that considers device load. However, the proposed system can be implemented with a GNN without memory as well. The proposed memory mechanism is a general strategy, and it could be used for capturing and preserving any specified structure from graphs. For example, it can be used for learning the hierarchical representation from program graphs. Specifically, an external memory may be defined that stores the hierarchical structure of the graph, and the auxiliary information from this memory may be retrieved and leveraged in each layer in the GNN for coarsening the input nodes and obtaining the hierarchical embedding for the graph. In particular, the hierarchical community structure in graphs may be considered, and the spectral clustering method (e.g., described in von Luxburg: "A tutorial on spectral clustering") may be used for initializing and updating this hierarchical community information to be stored in the memory. This memory-augmented approach is a general strategy that can be applied to any GNNs. The graph convolutional network (GCN) is used as an example below to illustrate this memory-augmented GNN framework.

In the following, a multi-layer GCN is considered with the layer-wise propagation rule as shown in Kipf et al.: "Semi-Supervised Classification with Graph Convolutional Networks". Given a graph G=(V, E) with an adjacency matrix $A \in \mathbb{R}^{n \times n}$ and node features in a matrix $X \in \mathbb{R}^{n \times d}$, it is assumed that $H^{(l)} \in \mathbb{R}^{n_l d_l}$ is the matrix of activations in the l-th layer. According to the propagation rule of GCN, the layer-wise propagation rule is $$H^{(l+1)} = \sigma\left(\tilde{D}^{-\frac{1}{2}} \tilde{A} \tilde{D}^{-\frac{1}{2}} H^{(l)} \Theta^{(l)}\right) \quad (1)$$

where $\tilde{A} = A + I_n$ is the weight matrix of the graph, $I_n$ is an identity matrix, $D \in \mathbb{R}^{n \times n}$ is the diagonal degree matrix of the graph, and $\sigma(\cdot)$ denotes the activation function (e.g., LeakyReLU). $\Theta$ is a layer-specific trainable weight matrix. $H^{(0)} = X$ is the input feature matrix of the graph.

For each of the graph convolutional layer $l+1(l \geq 0)$, an external memory is defined $M^{(l+1)} \in \mathbb{R}^{n_{l+1} \times n_l}$. It is assumed that the community indicator matrix obtained by spectral clustering is represented by $C^{(l)} \in \mathbb{R}^{n \times n_{l+1}}$. The memory for the $(l+1)$-th layer is defined as $M^{(l+1)} = C^{(l)T}$. Then, the community structure indicated by the memory is leveraged into the propagation as follows:

$$H^{(l+1)} = \sigma(M^{(l+1)} H^{(l)} \Theta^{(l)}) \quad (2)$$

In this manner, the output embedding of the Memory-augmented GCN inherently encodes the hierarchical community structure of the graph, which can benefit the further prediction using this learned embedding. FIG. 4 shows an overview of the graph learning with the proposed Memory-augmented GNN framework. FIG. 4 shows a schematic diagram of an example of graph learning with a memory-augmented GNN. In FIG. 4, the input graph 410 is provided to the GNN 420, which is coupled with memory 425. The GNN 420 transforms the input graph 410 into the encoding space 430, which results in the output embedding 440.

Optionally, the GNN can be pre-trained in a separate phase that does not involve program execution. The system may use a dataset of examples of program execution on devices to train the GNN independently of the other system modules. Pre-training may introduce a delay in running the system. Alternatively, the GNN can be trained together with the placement module, with immediate execution of programs, but potentially worse initial execution results.

In the following, the placement module is presented. The main component of the placement module is an RL agent that uses a deep neural network (e.g., the second machine-learning model introduced in connection with FIGS. 1*a* and 1*b*) as a policy to select a device for executing the program. The RL agent improves or optimizes the policy network in time by observing the execution of programs (e.g., using Proximal Policy Optimization, as described in Schulman et al.: "Proximal Policy Optimization Algorithms"). A machine learning approach based on RL allows the system to adapt to the execution environment.

Figure 5:
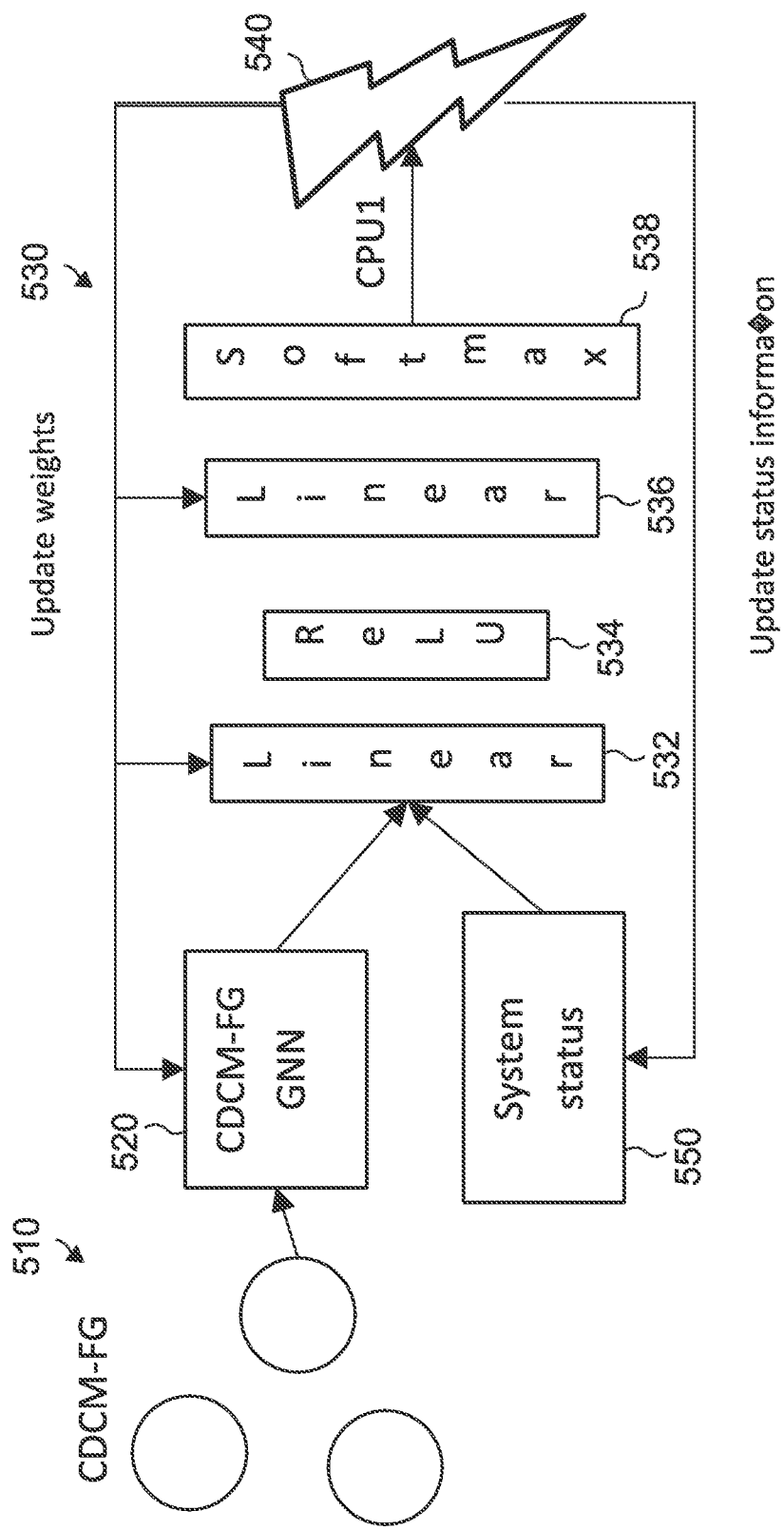
FIG. 5 shows a schematic diagram of an end-to-end training example with a feed-forward neural network reinforcement learning policy.

The placement module takes as input the embedding of the program and runtime information about the heterogeneous system (e.g., device usage). The module selects a device, executes the program, observes the outcome of execution (e.g., runtime or other metrics about the execution, such as the energy usage), and updates the GNN and policy network weights to improve future execution. The policy network can be a multi-layer feed-forward neural network with nonlinearities (e.g., rectified linear unit (ReLU)) and a softmax output layer for classification corresponding to the hardware configuration, as shown in FIG. 5. FIG. 5 shows a schematic diagram of an end-to-end training example with feed-forward neural network RL policy. In FIG. 5, the CDCM-FG graph 510 is provided to the CDCM-FG GNN 520 (i.e., the graph learning module). The output of the CDCM-FG GNN 520 (i.e., the vector embedding) is provided, together with the system status 550, to the policy network 530, which comprise at least the linear input layer 532, the ReLU layer 534, a further linear layer 536 and the softmax output layer 538). the output of the policy network 530 is used to place the computer program on a hardware device, in this case on CPU1 540. The metrics of the execution and of the load of the hardware device are provided to system status block 550 and are used to train the CDCM-FG GNN and the policy network 530.

The policy network can also learn based on a generic representation of the devices, such that the policy can be transferred to another computer with different devices an continue producing good results without retraining, which is a novel concept. For example, as shown in FIG. 6, the heterogeneous hardware can be represented as a graph 620, where device nodes connected by edges representing data transfer capabilities between them. The graph can have node labels representing device processing capabilities (e.g., integer operations per second, floating point operations per second (see FIG. 6: Tera Operations Per Second, TOPS, where CPU 1 is capable of 1 TOPS and CPU 2 is capable of 1 TOPS, while GPU 1 is capable of 3 TOPS and GPU 2 is capable of 10 TOPS)) and edge labels (e.g., bandwidth, latency). The system load information can be incorporated into the graph as additional node and edge labels (e.g., device load, such as 0% for CPU 1 in FIG. 6, 50% for CPU 2, 25% for GPU 1 and 0% for GPU 2). The program embedding produced by the CDCM-FG GNN 610 can also be incorporated as a node label shared by all nodes. A placement GNN 630 with an architecture similar to the CDCM-FG GNN can be trained on the hardware graph producing as output node labels representing probabilities for device selection (e.g., for selecting GPU2 in the example given in FIG. 6). Again, the computer program is executed on a hardware device (GPU2 640 in FIG. 6), and based on the metrics of the execution, the weights of the CDCM-FG and of the Placement GNN may be adapted. FIG. 6 may thus show a schematic diagram of an end-to-end training example with GNN RL policy.

Figure 7:
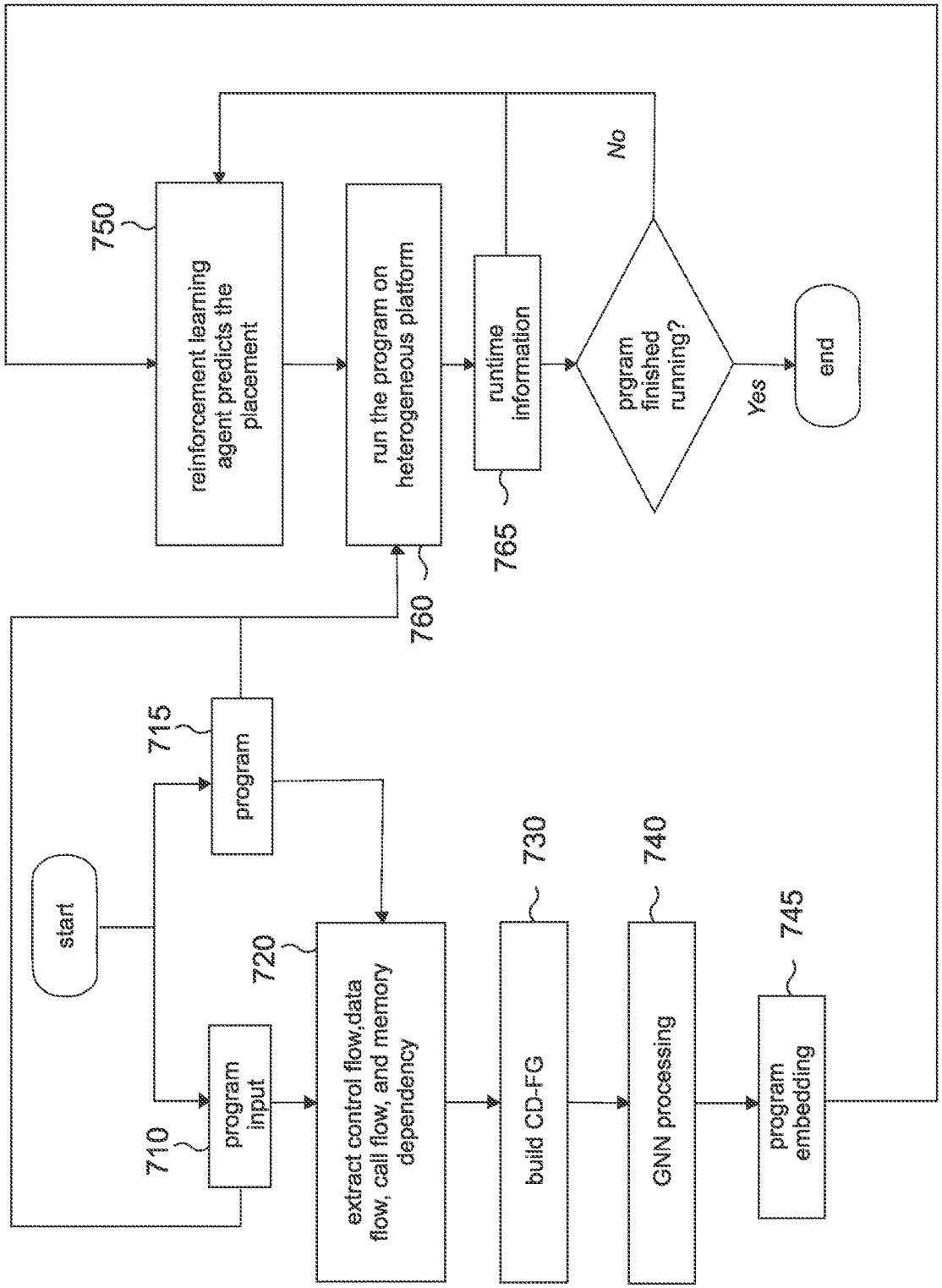
FIG. 7 shows a flow chart of an example of a system execution.

FIG. 7 shows a flow chart of an example of the system execution. The flow starts with providing the program input 710 and the program 715 to feature extraction block 720, which extracts the control flow, data flow, call flow and memory dependency of the computer program. A graph construction block 730 is used to build the CDCM-FG based on the extracted features, which is provided to the embedding GNN 740 to generate the program embedding 745. The program embedding is provided to the placement GNN 750, where a reinforcement learning agent is used to predict the placement. Based on the placement, the program 715 and the program input 710, the program is run on the heterogeneous platform 760, which results in runtime information 765, i.e., the metrics for characterizing the execution of the program. While the program has not finished running, the runtime information is provided to the placement GNN 750, where it is used to further improve the placement. Once the program has finished running, the flow ends.

More details of the proposes system are mentioned in connection with the proposed concept or one or more examples described above or below (e.g., FIG. 1*a* to 2*b*). The proposed system comprise one or more additional optional features corresponding to one or more aspects of the proposed concept, or one or more examples described above or below.

In the following, some examples of the proposed concept are presented:

An example (e.g., example 1) relates to an apparatus (10) comprising processing circuitry (14) configured to generate a graph representation of a computer program. The processing circuitry is configured to generate, using a first machine-learning model, a vector embedding of the graph representation of the computer program. The processing circuitry is configured to determine, based on an output of a second machine-learning model, a placement of an execution of the computer program on one or more hardware devices of a heterogenous plurality of hardware devices of a computer system, wherein the vector embedding and information on the load of the hardware devices are provided as input to the second machine-learning model.

Another example (e.g., example 2) relates to a previously described example (e.g., example 1) or to any of the examples described herein, further comprising that the processing circuitry is configured to generate the graph representation based on control flow, data flow, call flow and memory dependencies of the computer program.

Another example (e.g., example 3) relates to a previously described example (e.g., one of the examples 1 to 2) or to any of the examples described herein, further comprising that the processing circuitry is configured to generate the graph representation with a plurality of vertices and a plurality of edges, the plurality of vertices representing instructions, variables, and constants of the computer program.

Another example (e.g., example 4) relates to a previously described example (e.g., example 3) or to any of the examples described herein, further comprising that the processing circuitry is configured to insert edges representing control flow of the computer program, edges representing data flow of the computer program, edges representing call flow of the computer program and edges modeling memory dependencies among instructions into the graph representation.

Another example (e.g., example 5) relates to a previously described example (e.g., one of the examples 1 to 4) or to any of the examples described herein, further comprising that the processing circuitry is configured to generate the graph representation using at least one of static analysis and dynamic analysis.

Another example (e.g., example 6) relates to a previously described example (e.g., one of the examples 1 to 5) or to any of the examples described herein, further comprising that the processing circuitry is configured to generate the graph representation of the computer program based on source code of the computer program.

Another example (e.g., example 7) relates to a previously described example (e.g., one of the examples 1 to 5) or to any of the examples described herein, further comprising that the processing circuitry is configured to generate the graph representation of the computer program based on a device-independent representation of the computer program.

Another example (e.g., example 8) relates to a previously described example (e.g., example 7) or to any of the examples described herein, further comprising that the processing circuitry is configured to compile the computer program to generate a device-independent intermediate representation.

Another example (e.g., example 9) relates to a previously described example (e.g., one of the examples 1 to 8) or to any of the examples described herein, further comprising that the first machine-learning model is a first graph-based machine-learning model.

Another example (e.g., example 10) relates to a previously described example (e.g., example 9) or to any of the examples described herein, further comprising that the first graph-based machine-learning model is coupled with memory, wherein a hierarchical structure of the graph representation is stored in the memory and is accessible in the memory by the layers of the first graph-based machine-learning model.

Another example (e.g., example 11) relates to a previously described example (e.g., one of the examples 9 to 10) or to any of the examples described herein, further comprising that the first graph-based machine-learning model is trained to determine a hierarchical community structure of the graph representation using spectral clustering.

Another example (e.g., example 12) relates to a previously described example (e.g., example 11) or to any of the examples described herein, further comprising that the vector embedding represents the hierarchical community structure of the graph representation.

Another example (e.g., example 13) relates to a previously described example (e.g., one of the examples 1 to 12) or to any of the examples described herein, further comprising that the processing circuitry is configured to determine the placement of the execution of the computer program by determining an initial placement using the second machine-learning model, executing the computer program using the one or more hardware devices as selected by the initial placement, adapting the second machine-learning model using reinforcement learning based on runtime metrics of the execution of the computer program, and repeating the determining of the placement, execution of the computer program and adaptation of the second machine-learning model until a termination condition is met.

Another example (e.g., example 14) relates to a previously described example (e.g., example 13) or to any of the examples described herein, further comprising that the reinforcement learning is based on a reward function, wherein the reward function is based on at least one of a runtime duration of the execution of the computer program and an energy usage of the execution of the computer program.

Another example (e.g., example 15) relates to a previously described example (e.g., one of the examples 1 to 14) or to any of the examples described herein, further comprising that the processing circuitry is configured to provide a further graph representation of the heterogeneous plurality of hardware devices as input to the second machine-learning model, the further graph representation comprising the information on the dynamic load of the hardware devices.

Another example (e.g., example 16) relates to a previously described example (e.g., example 15) or to any of the examples described herein, further comprising that the vertices of the further graph representation represent the hardware devices and the edges of the further graph representation represent the transfer capabilities between the hardware devices.

Another example (e.g., example 17) relates to a previously described example (e.g., example 16) or to any of the examples described herein, further comprising that the information on the dynamic load of the hardware devices is included in the further graph representation as labels of the vertices of the further graph representation.

Another example (e.g., example 18) relates to a previously described example (e.g., example 17) or to any of the examples described herein, further comprising that information of the dynamic load on the data transfer capabilities between the hardware devices is included in the further graph representation as labels of the edges of the further graph representation.

Another example (e.g., example 19) relates to a previously described example (e.g., one of the examples 16 to 18) or to any of the examples described herein, further comprising that the further graph representation is based on a device-independent graph, with processing capabilities of the heterogeneous plurality of hardware devices being included in the device-independent graph as labels of the vertices of the further graph representation, wherein the second machine-learning model is trained to determine the placement based on the device-independent graph and the labels indicating the processing capabilities of the hardware devices.

Another example (e.g., example 20) relates to a previously described example (e.g., one of the examples 1 to 19) or to any of the examples described herein, further comprising that the second machine-learning model is a second graph-based machine-learning model.

Another example (e.g., example 21) relates to a previously described example (e.g., example 20) or to any of the examples described herein, further comprising that the second graph-based machine-learning model is a multi-layer feed-forward neural network with nonlinearities and a softmax output layer.

Another example (e.g., example 22) relates to a previously described example (e.g., one of the examples 1 to 21) or to any of the examples described herein, further comprising that the second machine-learning model is trained to provide an output representing a placement of the execution of the computer program on the heterogeneous plurality of hardware devices.

Another example (e.g., example 23) relates to a previously described example (e.g., one of the examples 1 to 22) or to any of the examples described herein, further comprising that the heterogeneous plurality of hardware devices comprises at least two different hardware devices.

Another example (e.g., example 24) relates to a previously described example (e.g., one of the examples 1 to 23) or to any of the examples described herein, further comprising that the heterogeneous plurality of hardware devices comprise at least two of one or more central processing units, one or more accelerator cards, one or more graphics processing units and one or more field-programmable gate arrays.

An example (e.g., example 25) relates to a computer system comprising the apparatus according to one of the previous examples, e.g., one of the examples 1 to 24, and the heterogeneous plurality of hardware devices.

An example (e.g., example 26) relates to a device (10) comprising means for processing (14) configured to generate a graph representation of a computer program. The means for processing is configured to generate, using a first machine-learning model, a vector embedding of the graph representation of the computer program. The means for processing is configured to determine, based on an output of a second machine-learning model, a placement of an execution of the computer program on one or more hardware devices of a heterogenous plurality of hardware devices of a computer system, wherein the vector embedding and information on the load of the hardware devices are provided as input to the second machine-learning model.

Another example (e.g., example 27) relates to a previously described example (e.g., example 26) or to any of the examples described herein, further comprising that the means for processing is configured to generate the graph representation based on control flow, data flow, call flow and memory dependencies of the computer program.

Another example (e.g., example 28) relates to a previously described example (e.g., one of the examples 26 to 27) or to any of the examples described herein, further comprising that the means for processing is configured to generate the graph representation with a plurality of vertices and a plurality of edges, the plurality of vertices representing instructions, variables, and constants of the computer program.

Another example (e.g., example 29) relates to a previously described example (e.g., example 28) or to any of the examples described herein, further comprising that the means for processing is configured to insert edges representing control flow of the computer program, edges representing data flow of the computer program, edges representing call flow of the computer program and edges modeling memory dependencies among instructions into the graph representation.

Another example (e.g., example 30) relates to a previously described example (e.g., one of the examples 26 to 29) or to any of the examples described herein, further comprising that the means for processing is configured to generate the graph representation using at least one of static analysis and dynamic analysis.

Another example (e.g., example 31) relates to a previously described example (e.g., one of the examples 26 to 30) or to any of the examples described herein, further comprising that the means for processing is configured to generate the graph representation of the computer program based on source code of the computer program.

Another example (e.g., example 32) relates to a previously described example (e.g., one of the examples 26 to 30) or to any of the examples described herein, further comprising that the means for processing is configured to generate the graph representation of the computer program based on a device-independent representation of the computer program.

Another example (e.g., example 33) relates to a previously described example (e.g., example 32) or to any of the examples described herein, further comprising that the means for processing is configured to compile the computer program to generate a device-independent intermediate representation.

Another example (e.g., example 34) relates to a previously described example (e.g., one of the examples 26 to 33) or to any of the examples described herein, further comprising that the first machine-learning model is a first graph-based machine-learning model.

Another example (e.g., example 35) relates to a previously described example (e.g., example 34) or to any of the examples described herein, further comprising that the first graph-based machine-learning model is coupled with memory, wherein a hierarchical structure of the graph representation is stored in the memory and is accessible in the memory by the layers of the first graph-based machine-learning model.

Another example (e.g., example 36) relates to a previously described example (e.g., one of the examples 34 to 35) or to any of the examples described herein, further comprising that the first graph-based machine-learning model is trained to determine a hierarchical community structure of the graph representation using spectral clustering.

Another example (e.g., example 37) relates to a previously described example (e.g., example 36) or to any of the examples described herein, further comprising that the vector embedding represents the hierarchical community structure of the graph representation.

Another example (e.g., example 38) relates to a previously described example (e.g., one of the examples 26 to 37) or to any of the examples described herein, further comprising that the means for processing is configured to determine the placement of the execution of the computer program by determining an initial placement using the second machine-learning model, executing the computer program using the one or more hardware devices as selected by the initial placement, adapting the second machine-learning model using reinforcement learning based on runtime metrics of the execution of the computer program, and repeating the determining of the placement, execution of the computer program and adaptation of the second machine-learning model until a termination condition is met.

Another example (e.g., example 39) relates to a previously described example (e.g., example 38) or to any of the examples described herein, further comprising that the reinforcement learning is based on a reward function, wherein the reward function is based on at least one of a runtime duration of the execution of the computer program and an energy usage of the execution of the computer program.

Another example (e.g., example 40) relates to a previously described example (e.g., one of the examples 26 to 39) or to any of the examples described herein, further comprising that the means for processing is configured to provide a further graph representation of the heterogeneous plurality of hardware devices as input to the second machine-learning model, the further graph representation comprising the information on the dynamic load of the hardware devices.

Another example (e.g., example 41) relates to a previously described example (e.g., example 40) or to any of the examples described herein, further comprising that the vertices of the further graph representation represent the hardware devices and the edges of the further graph representation represent the transfer capabilities between the hardware devices.

Another example (e.g., example 42) relates to a previously described example (e.g., example 41) or to any of the examples described herein, further comprising that the information on the dynamic load of the hardware devices is included in the further graph representation as labels of the vertices of the further graph representation.

Another example (e.g., example 43) relates to a previously described example (e.g., example 42) or to any of the examples described herein, further comprising that information of the dynamic load on the data transfer capabilities between the hardware devices is included in the further graph representation as labels of the edges of the further graph representation.

Another example (e.g., example 44) relates to a previously described example (e.g., one of the examples 41 to 43) or to any of the examples described herein, further comprising that the further graph representation is based on a device-independent graph, with processing capabilities of the heterogeneous plurality of hardware devices being included in the device-independent graph as labels of the vertices of the further graph representation, wherein the second machine-learning model is trained to determine the placement based on the device-independent graph and the labels indicating the processing capabilities of the hardware devices.

Another example (e.g., example 45) relates to a previously described example (e.g., one of the examples 26 to 44) or to any of the examples described herein, further comprising that the second machine-learning model is a second graph-based machine-learning model.

Another example (e.g., example 46) relates to a previously described example (e.g., example 45) or to any of the examples described herein, further comprising that the second graph-based machine-learning model is a multi-layer feed-forward neural network with nonlinearities and a softmax output layer.

Another example (e.g., example 47) relates to a previously described example (e.g., one of the examples 26 to 46) or to any of the examples described herein, further comprising that the second machine-learning model is trained to provide an output representing a placement of the execution of the computer program on the heterogeneous plurality of hardware devices.

Another example (e.g., example 48) relates to a previously described example (e.g., one of the examples 26 to 47) or to any of the examples described herein, further comprising that the heterogeneous plurality of hardware devices comprises at least two different hardware devices.

Another example (e.g., example 49) relates to a previously described example (e.g., one of the examples 26 to 48) or to any of the examples described herein, further comprising that the heterogeneous plurality of hardware devices comprise at least two of one or more central processing units, one or more accelerator cards, one or more graphics processing units and one or more field-programmable gate arrays.

An example (e.g., example 50) relates to a computer system comprising the device according to one of the previous examples, e.g., one of the examples 26 to 49, and the heterogeneous plurality of hardware devices.

An example (e.g., example 51) relates to a method comprising generating (120) a graph representation of a computer program. The method comprises generating (130), using a first machine-learning model, a vector embedding of the graph representation of the computer program. The method comprises determining (150), based on an output of a second machine-learning model, a placement of an execution of the computer program on one or more hardware devices of a heterogenous plurality of hardware devices of a computer system, wherein the vector embedding and information on the load of the hardware devices are provided as input to the second machine-learning model.

Another example (e.g., example 52) relates to a previously described example (e.g., example 51) or to any of the examples described herein, further comprising that the method comprises generating (120) the graph representation based on control flow, data flow, call flow and memory dependencies of the computer program.

Another example (e.g., example 53) relates to a previously described example (e.g., one of the examples 51 to 52) or to any of the examples described herein, further comprising that the method comprises generating (120) the graph representation with a plurality of vertices and a plurality of edges, the plurality of vertices representing instructions, variables, and constants of the computer program.

Another example (e.g., example 54) relates to a previously described example (e.g., example 53) or to any of the examples described herein, further comprising that the method comprises inserting edges (125) representing control flow of the computer program, edges representing data flow of the computer program, edges representing call flow of the computer program and edges modeling memory dependencies among instructions into the graph representation.

Another example (e.g., example 55) relates to a previously described example (e.g., one of the examples 51 to 54)

or to any of the examples described herein, further comprising that the method comprises generating (120) the graph representation using at least one of static analysis and dynamic analysis.

Another example (e.g., example 56) relates to a previously described example (e.g., one of the examples 51 to 55) or to any of the examples described herein, further comprising that the method comprises generating (120) the graph representation of the computer program based on source code of the computer program.

Another example (e.g., example 57) relates to a previously described example (e.g., one of the examples 51 to 55) or to any of the examples described herein, further comprising that the method comprises generating (120) the graph representation of the computer program based on a device-independent representation of the computer program.

Another example (e.g., example 58) relates to a previously described example (e.g., example 57) or to any of the examples described herein, further comprising that the method comprises compiling (110) the computer program to generate a device-independent intermediate representation.

Another example (e.g., example 59) relates to a previously described example (e.g., one of the examples 51 to 58) or to any of the examples described herein, further comprising that the first machine-learning model is a first graph-based machine-learning model.

Another example (e.g., example 60) relates to a previously described example (e.g., example 59) or to any of the examples described herein, further comprising that the first graph-based machine-learning model is coupled with memory, wherein a hierarchical structure of the graph representation is stored in the memory and is accessible in the memory by the layers of the first graph-based machine-learning model.

Another example (e.g., example 61) relates to a previously described example (e.g., one of the examples 59 to 60) or to any of the examples described herein, further comprising that the first graph-based machine-learning model is trained to determine a hierarchical community structure of the graph representation using spectral clustering.

Another example (e.g., example 62) relates to a previously described example (e.g., example 61) or to any of the examples described herein, further comprising that the vector embedding represents the hierarchical community structure of the graph representation.

Another example (e.g., example 63) relates to a previously described example (e.g., one of the examples 51 to 62) or to any of the examples described herein, further comprising that the method comprises determining (150) the placement of the execution of the computer program by determining (152) an initial placement using the second machine-learning model, executing (154) the computer program using the one or more hardware devices as selected by the initial placement, adapting (156) the second machine-learning model using reinforcement learning based on runtime metrics of the execution of the computer program, and repeating (158) the determining of the placement, execution of the computer program and adaptation of the second machine-learning model until a termination condition is met.

Another example (e.g., example 64) relates to a previously described example (e.g., example 63) or to any of the examples described herein, further comprising that the reinforcement learning is based on a reward function, wherein the reward function is based on at least one of a runtime duration of the execution of the computer program and an energy usage of the execution of the computer program.

Another example (e.g., example 65) relates to a previously described example (e.g., one of the examples 51 to 64) or to any of the examples described herein, further comprising that the method comprises providing (140) a further graph representation of the heterogeneous plurality of hardware devices as input to the second machine-learning model, the further graph representation comprising the information on the dynamic load of the hardware devices.

Another example (e.g., example 66) relates to a previously described example (e.g., example 65) or to any of the examples described herein, further comprising that the vertices of the further graph representation represent the hardware devices and the edges of the further graph representation represent the transfer capabilities between the hardware devices.

Another example (e.g., example 67) relates to a previously described example (e.g., example 66) or to any of the examples described herein, further comprising that the information on the dynamic load of the hardware devices is included in the further graph representation as labels of the vertices of the further graph representation.

Another example (e.g., example 68) relates to a previously described example (e.g., example 67) or to any of the examples described herein, further comprising that information of the dynamic load on the data transfer capabilities between the hardware devices is included in the further graph representation as labels of the edges of the further graph representation.

Another example (e.g., example 69) relates to a previously described example (e.g., one of the examples 16 to 68) or to any of the examples described herein, further comprising that the further graph representation is based on a device-independent graph, with processing capabilities of the heterogeneous plurality of hardware devices being included in the device-independent graph as labels of the vertices of the further graph representation, wherein the second machine-learning model is trained to determine the placement based on the device-independent graph and the labels indicating the processing capabilities of the hardware devices.

Another example (e.g., example 70) relates to a previously described example (e.g., one of the examples 51 to 69) or to any of the examples described herein, further comprising that the second machine-learning model is a second graph-based machine-learning model.

Another example (e.g., example 71) relates to a previously described example (e.g., example 70) or to any of the examples described herein, further comprising that the second graph-based machine-learning model is a multi-layer feed-forward neural network with nonlinearities and a softmax output layer.

Another example (e.g., example 72) relates to a previously described example (e.g., one of the examples 51 to 71) or to any of the examples described herein, further comprising that the second machine-learning model is trained to provide an output representing a placement of the execution of the computer program on the heterogeneous plurality of hardware devices.

Another example (e.g., example 73) relates to a previously described example (e.g., one of the examples 51 to 72) or to any of the examples described herein, further comprising that the heterogeneous plurality of hardware devices comprises at least two different hardware devices.

Another example (e.g., example 74) relates to a previously described example (e.g., one of the examples 51 to 73) or to any of the examples described herein, further comprising that the heterogeneous plurality of hardware devices comprise at least two of one or more central processing units, one or more accelerator cards, one or more graphics processing units and one or more field-programmable gate arrays.

An example (e.g., example 75) relates to a method for training a machine-learning model for determining a placement of an execution of a computer program, the method comprising providing (210) a plurality of training samples for training the machine-learning model, each training sample comprising a vector embedding of a graph representation of a computer program and information on the load of hardware devices of a heterogeneous plurality of hardware devices. The method comprises training (220) the machine-learning model using reinforcement learning, by determining an initial placement of an execution of the computer program on one or more of a heterogenous plurality of hardware devices based on an output of the machine-learning model, executing the computer program using the one or more hardware devices as selected by the placement, adapting the second machine-learning model using reinforcement learning based on runtime metrics of the execution of the computer program, and repeating the determining of the placement, execution of the computer program and adaptation of the machine-learning model until a termination condition is met.

Another example (e.g., example 76) relates to a previously described example (e.g., example 75) or to any of the examples described herein, further comprising that the reinforcement learning is based on a reward function, wherein the reward function is based on at least one of a runtime duration of the execution of the computer program and an energy usage of the execution of the computer program.

Another example (e.g., example 77) relates to a previously described example (e.g., one of the examples 75 to 76) or to any of the examples described herein, further comprising that each training sample comprises a further graph representation of the heterogeneous plurality of hardware devices, the further graph representation comprising the information on the dynamic load of the hardware devices.

Another example (e.g., example 78) relates to a previously described example (e.g., example 77) or to any of the examples described herein, further comprising that the vertices of the further graph representation represent the hardware devices and the edges of the further graph representation represent the data transfer capabilities between the hardware devices.

Another example (e.g., example 79) relates to a previously described example (e.g., example 78) or to any of the examples described herein, further comprising that the information on the dynamic load of the hardware devices is included in the further graph representation as labels of the vertices of the further graph representation.

Another example (e.g., example 80) relates to a previously described example (e.g., example 79) or to any of the examples described herein, further comprising that information of the dynamic load on the data transfer capabilities between the hardware devices is included in the further graph representation as labels of the edges of the further graph representation.

Another example (e.g., example 81) relates to a previously described example (e.g., one of the examples 78 to 80) or to any of the examples described herein, further comprising that the further graph representation is based on a device-independent graph, with processing capabilities of the heterogeneous plurality of hardware devices being included in the further graph representation as labels of the vertices of the device-independent graph, wherein the machine-learning model is trained to determine the placement based on the device-independent graph and the labels indicating the processing capabilities of the hardware devices.

Another example (e.g., example 82) relates to a previously described example (e.g., one of the examples 75 to 81) or to any of the examples described herein, further comprising that the machine-learning model is a graph-based machine-learning model.

Another example (e.g., example 83) relates to a previously described example (e.g., example 82) or to any of the examples described herein, further comprising that the graph-based machine-learning model is a multi-layer feed-forward neural network with nonlinearities and a softmax output layer.

Another example (e.g., example 84) relates to a previously described example (e.g., one of the examples 75 to 83) or to any of the examples described herein, further comprising that the machine-learning model is trained to provide an output representing a placement of the execution of the computer program on the heterogeneous plurality of hardware devices.

Another example (e.g., example 85) relates to a previously described example (e.g., one of the examples 75 to 84) or to any of the examples described herein, further comprising that the vector embedding represents a hierarchical community structure of the graph representation Another example (e.g., example 86) relates to a previously described example (e.g., one of the examples 75 to 87) or to any of the examples described herein, further comprising that the method comprises providing (230) a further plurality of training samples for training a further machine-learning model, each sample of the plurality of plurality of further training samples comprising the graph representation of the computer program, and training (240) the further machine-learning model together with the machine-learning model, by training the further machine-learning model to provide the vector embedding of the graph representation of the computer program, and using the vector embedding provided by the further machine-learning model within the plurality of training samples.

Another example (e.g., example 87) relates to a previously described example (e.g., example 86) or to any of the examples described herein, further comprising that the graph-based representation of the computer program comprises a plurality of vertices and a plurality of edges, the plurality of vertices representing the instructions, variables, and constants of the computer program, and the plurality of edges comprising one or more edges representing a control flow of the computer program, one or more edges representing a data flow of the computer program, one or more edges representing a call flow of the computer program and one or more edges modeling a memory dependency among instructions.

Another example (e.g., example 88) relates to a previously described example (e.g., one of the examples 86 to 87) or to any of the examples described herein, further comprising that the further machine-learning model is a further graph-based machine-learning model.

Another example (e.g., example 89) relates to a previously described example (e.g., example 88) or to any of the examples described herein, further comprising that the further graph-based machine-learning model is coupled with memory, wherein a hierarchical structure of the graph representation is stored in the memory and is accessible in the memory by the layers of the first graph-based machine-learning model.

Another example (e.g., example 90) relates to a previously described example (e.g., one of the examples 88 to 89) or to any of the examples described herein, further comprising that the further graph-based machine-learning model is trained to determine a hierarchical community structure of the graph representation using spectral clustering.

An example (e.g., example 91) relates to an apparatus (20) comprising processing circuitry (24), configured to perform the above-referenced method, e.g., the method according to one of the examples 75 to 90.

An example (e.g., example 92) relates to a device (20) comprising means for processing (24), configured to perform the above-referenced method, e.g., the method according to one of the examples 75 to 90.

An example (e.g., example 93) relates to a machine-readable storage medium including program code, when executed, to cause a machine to perform the method of any of the examples, e.g., of one of the examples 51 to 74 or the method according to one of the examples 75 to 90.

An example (e.g., example 94) relates to a computer program having a program code for performing a method according to any example, e.g., the method of one of the examples 51 to 74 or the method according to one of the examples 75 to 90, when the computer program is executed on a computer, a processor, or a programmable hardware component.

An example (e.g., example 95) relates to a machine-readable storage including machine readable instructions, when executed, to implement a method or realize an apparatus as claimed in any pending claim or shown in any example.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

The disclosed methods, apparatuses, and systems are not to be construed as limiting in any way. Instead, the present disclosure is directed toward all novel and nonobvious features and aspects of the various disclosed examples, alone and in various combinations and subcombinations with one another. The disclosed methods, apparatuses, and systems are not limited to any specific aspect or feature or combination thereof, nor do the disclosed examples require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

What is claimed is:

1. An apparatus comprising processing circuitry configured to:
   generate a graph representation of a computer program;
   generate, using a first machine-learning model, a vector embedding of the graph representation of the computer program;
   determine, based on an output of a second machine-learning model, a placement of an execution of the computer program on one or more hardware devices of a heterogenous plurality of hardware devices of a computer system, wherein the vector embedding of the graph representation of the computer program and information on load of the heterogenous plurality of hardware devices of the computer system are provided as input to the second machine-learning model; and
   execute the computer program using the one or more hardware devices of the heterogenous plurality of hardware devices of the computer system based on training the first machine-learning model using reinforcement learning, by:
      determining the placement of the execution of the computer program by determining an initial placement of the execution of the computer program using the second machine-learning model,
      executing the computer program using the one or more hardware devices of the heterogenous plurality of hardware devices of the computer system as selected by the initial placement of the execution of the computer program,
      training the second machine-learning model using reinforcement learning based on runtime metrics of the execution of the computer program, and
      repeating the determining of the placement of the execution of the computer program, the executing of the computer program, and the training of the second machine-learning model until a termination condition is met.

2. The apparatus according to claim 1, wherein the processing circuitry is further configured to generate the graph representation of the computer program based on control flow, data flow, call flow, and memory dependencies of the computer program.

3. The apparatus according to claim 1, wherein the processing circuitry is further configured to generate the graph representation of the computer program with a plurality of vertices and a plurality of edges, and wherein the plurality of vertices represent instructions, variables, and constants of the computer program.

4. The apparatus according to claim 3, wherein the processing circuitry is further configured to insert edges representing control flow of the computer program, edges representing data flow of the computer program, edges representing call flow of the computer program, and edges representing memory dependencies of the computer program into the graph representation of the computer program.

5. The apparatus according to claim 1, wherein the processing circuitry is further configured to generate the graph representation of the computer program using at least one of static analysis and dynamic analysis.

6. The apparatus according to claim 1, wherein the processing circuitry is further configured to generate the graph representation of the computer program based on source code of the computer program.

7. The apparatus according to claim 1, wherein the processing circuitry is further configured to compile the computer program to generate a device-independent intermediate representation of the computer program, and to generate the graph representation of the computer program based on the device-independent intermediate representation of the computer program.

8. The apparatus according to claim 1, wherein the first machine-learning model is a first graph-based machine-learning model.

9. The apparatus according to claim 8, wherein the first graph-based machine-learning model is coupled with a memory, and wherein a hierarchical structure of the graph representation of the computer program is stored in the memory and is accessible in the memory by layers of the first graph-based machine-learning model.

10. The apparatus according to claim 8, wherein the first graph-based machine-learning model is trained to determine a hierarchical community structure of the graph representation of the computer program using spectral clustering, and wherein the vector embedding of the graph representation of the computer program represents the hierarchical community structure of the graph representation of the computer program.

11. The apparatus according to claim 1, wherein the reinforcement learning is based on a reward function, and wherein the reward function is based on at least one of a runtime duration of the execution of the computer program and an energy usage of the execution of the computer program.

12. The apparatus according to claim 1, wherein the processing circuitry is further configured to provide a further graph representation of the heterogeneous plurality of hardware devices of the computer system as input to the second machine-learning model, and wherein the further graph representation of the heterogeneous plurality of hardware devices of the computer system comprises information on dynamic load of the heterogenous plurality of hardware devices of the computer system.

13. The apparatus according to claim 12, wherein a plurality of vertices of the further graph representation of the heterogeneous plurality of hardware devices of the computer system represent the heterogeneous plurality of hardware devices of the computer system and a plurality of edges of the further graph representation of the heterogeneous plurality of hardware devices of the computer system represent data transfer capabilities between the heterogeneous plurality of hardware devices of the computer system.

14. The apparatus according to claim 13, wherein the information on the dynamic load of the heterogenous plurality of hardware devices of the computer system is included in the further graph representation of the heterogeneous plurality of hardware devices of the computer system as labels of the plurality of vertices of the further graph representation of the heterogeneous plurality of hardware devices of the computer system.

15. The apparatus according to claim 14, wherein information on the data transfer capabilities between the heterogeneous plurality of hardware devices of the computer system is included in the further graph representation of the heterogeneous plurality of hardware devices of the computer system as labels of the plurality of edges of the further graph representation of the heterogeneous plurality of hardware devices of the computer system.

16. The apparatus according to claim 14, wherein the further graph representation of the heterogeneous plurality of hardware devices of the computer system is based on a device-independent graph, with processing capabilities of the heterogeneous plurality of hardware devices of the computer system being included in the device-independent graph as labels of the plurality of vertices of the further graph representation of the heterogeneous plurality of hardware devices of the computer system, and wherein the second machine-learning model is trained to determine the placement of the execution of the computer program based on the device-independent graph and the labels of the plurality of vertices of the further graph representation of the heterogeneous plurality of hardware devices of the computer system indicating the processing capabilities of the heterogenous plurality of hardware devices of the computer system.

17. The apparatus according to claim 1, wherein the heterogeneous plurality of hardware devices of the computer system comprises at least two different heterogeneous hardware devices.

18. The apparatus according to claim 1, wherein the heterogeneous plurality of hardware devices of the computer system comprise at least two of one or more central processing units, one or more accelerator cards, one or more graphics processing units, and one or more field-programmable gate arrays.

19. A method comprising:
generating a graph representation of a computer program;
generating, using a first machine-learning model, a vector embedding of the graph representation of the computer program;
determining, based on an output of a second machine-learning model, a placement of an execution of the computer program on one or more hardware devices of a heterogenous plurality of hardware devices of a computer system, wherein the vector embedding of the graph representation of the computer program and information on load of the heterogenous plurality of hardware devices of the computer system are provided as input to the second machine-learning model; and
executing the computer program using the one or more hardware devices of the heterogenous plurality of hardware devices of the computer system based on training the first machine-learning model using reinforcement learning, by:
determining the placement of the execution of the computer program by determining an initial placement of the execution of the computer program using the second machine-learning model,
executing the computer program using the one or more hardware devices of the heterogenous plurality of hardware devices of the computer system as selected by the initial placement of the execution of the computer program,
training the second machine-learning model using reinforcement learning based on runtime metrics of the execution of the computer program, and
repeating the determining of the placement of the execution of the computer program, the executing of the computer program, and the training of the second machine-learning model until a termination condition is met.

20. A non-transitory computer readable storage medium storing program code, when executed by a computer, to cause the computer to perform a method, the method comprising:
generating a graph representation of a computer program;
generating, using a first machine-learning model, a vector embedding of the graph representation of the computer program;
determining, based on an output of a second machine-learning model, a placement of an execution of the computer program on one or more hardware devices of a heterogenous plurality of hardware devices of a computer system, wherein the vector embedding of the graph representation of the computer program and information on load of the heterogenous plurality of hardware devices of the computer system are provided as input to the second machine-learning model; and
executing the computer program using the one or more hardware devices of the heterogenous plurality of hardware devices of the computer system based on training the first machine-learning model using reinforcement learning, by:
determining the placement of the execution of the computer program by determining an initial placement of the execution of the computer program using the second machine-learning model,
executing the computer program using the one or more hardware devices of the heterogenous plurality of hardware devices of the computer system as selected by the initial placement of the execution of the computer program,
training the second machine-learning model using reinforcement learning based on runtime metrics of the execution of the computer program, and
repeating the determining of the placement of the execution of the computer program, the executing of the computer program, and the training of the second machine-learning model until a termination condition is met.

21. A method for training a first machine-learning model for determining a placement of an execution of a computer program on one or more hardware devices of a heterogenous plurality of hardware devices of a computer system, the method comprising:
- providing a plurality of training samples for training a first machine-learning model, wherein each training sample of the plurality of training samples comprises a vector embedding of a graph representation of a computer program and information on load of a heterogeneous plurality of hardware devices of a computer system; and
- executing the computer program using the one or more hardware devices of the heterogenous plurality of hardware devices of the computer system based on training the first machine-learning model using reinforcement learning, by:
  - determining an initial placement of an execution of the computer program on one or more hardware devices of the heterogenous plurality of hardware devices of the computer system based on an output of a second machine-learning model,
  - executing the computer program using the one or more hardware devices of the heterogenous plurality of hardware devices of the computer system as selected by the initial placement of the execution of the computer program,
  - training the second machine-learning model using reinforcement learning based on runtime metrics of the execution of the computer program, and
  - repeating the determining of the placement of the execution of the computer program, the executing of the computer program, and the training of the second machine-learning model until a termination condition is met.

22. The method according to claim 21, further comprising:
- providing a further plurality of training samples for training a further machine-learning model, wherein each training sample of the further plurality of training samples comprises the vector embedding of the graph representation of the computer program; and
- training the further machine-learning model together with the first machine-learning model, by:
  - training the further machine-learning model to provide the vector embedding of the graph representation of the computer program, and
  - using the vector embedding of the graph representation of the computer program provided by the further machine-learning model within the further plurality of training samples.

\* \* \* \* \*